(12) United States Patent
Harada et al.

(10) Patent No.: US 12,009,844 B2
(45) Date of Patent: Jun. 11, 2024

(54) OPTICAL COMMUNICATION SYSTEM, MASTER STATION, AND OPTICAL COMMUNICATION METHOD

(71) Applicant: NIPPON TELEGRAPH AND TELEPHONE CORPORATION, Tokyo (JP)

(72) Inventors: Rintaro Harada, Musashino (JP); Hirotaka Ujikawa, Musashino (JP); Shin Kaneko, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 47 days.

(21) Appl. No.: 17/921,569

(22) PCT Filed: May 12, 2020

(86) PCT No.: PCT/JP2020/018994
§ 371 (c)(1),
(2) Date: Oct. 26, 2022

(87) PCT Pub. No.: WO2021/229688
PCT Pub. Date: Nov. 18, 2021

(65) Prior Publication Data
US 2023/0170990 A1 Jun. 1, 2023

(51) Int. Cl.
*H04B 10/00* (2013.01)
*H04B 10/035* (2013.01)
(Continued)

(52) U.S. Cl.
CPC ....... *H04B 10/035* (2013.01); *H04B 10/0795* (2013.01)

(58) Field of Classification Search
CPC .... H04B 10/03; H04B 10/032; H04B 10/275; H04B 10/2755
See application file for complete search history.

(56) References Cited

U.S. PATENT DOCUMENTS

2016/0269105 A1* 9/2016 Yoshida .............. H04B 10/032
2021/0266069 A1* 8/2021 Masumoto ......... H04B 10/2513

OTHER PUBLICATIONS

Rintaro Harada et al., Cyclic Wavelength Allocation Scheme Reducing the Number of Wavelengths in Bus-Topology WDM Access Systems, 2020 General Conference of the Institute of Electronics, Information and Communication Engineers, Mar. 3, 2020.
(Continued)

*Primary Examiner* — Daniel G Dobson
(74) *Attorney, Agent, or Firm* — Harness, Dickey & Pierce, P.L.C.

(57) ABSTRACT

Time taken for resuming communication in a protection scheme using a backup path in an optical communication system including a master station device and a plurality of slave station devices is decreased. The plurality of slave station devices are connected in parallel to a looped path. A communication path between the master station device and each of the slave station device includes a normal path and a backup path. The master station device performs communication control processing for each of the slave station device based on RTT. A first slave station device is a slave station device with which communication through the normal path has become impossible. First backup path RTT of the first slave station device is calculated based on first normal path RTT of the first slave station device, first partial RTT between the master station device and the looped path, and loop propagation time necessary for one trip through the looped path. The communication control processing for the first slave station device is resumed based on the calculated
(Continued)

first backup path RTT without measurement of the first backup path RTT when the first slave station device is sensed.

8 Claims, 17 Drawing Sheets

(51) Int. Cl.
*H04B 10/079* (2013.01)
*H04J 14/00* (2006.01)

(56) References Cited

OTHER PUBLICATIONS

Hirotaka Ujikawa et al., Protection Architecture for Reliable Bus-topology WDM Access Systems, 2020 General Conference of the Institute of Electronics, Information and Communication Engineers, Mar. 3, 2020.

* cited by examiner

OPTICAL COMMUNICATION SYSTEM, MASTER STATION, AND OPTICAL COMMUNICATION METHOD

CROSS-REFERENCE TO RELATED APPLICATIONS

This application is a 371 U.S. National Phase of International Application No. PCT/JP2020/018994, filed on May 12, 2020. The entire disclosure of the above application is incorporated herein by reference.

TECHNICAL FIELD

The present invention relates to an optical communication system, an optical communication method, and a master station device in an optical communication system.

BACKGROUND ART

A passive optical network (PON) system is known as an optical communication system. Recently, a TWDM (time and wavelength division multiplexing)-PON system using a wavelength division multiplexing (WDM) technology has been proposed.

Non-Patent Literature 1 discloses a bus-topology WDM access system as an example of the TWDM-PON system. Network topology of an optical line termination or optical line terminal (OLT) and an optical network unit (ONU) is bus topology. Such a bus-topology WDM access system is applied to, for example, mobile fronthaul (MFH) for linearly expanding a mobile communication area.

Non-Patent Literature 2 discloses a protection scheme for improving reliability of a bus-topology WDM access system. In the case of bus topology, communication with a large number of ONUS is potentially disconnected when breaking occurs to a trunk fiber. To avoid this disconnection, a main trunk fiber and a backup trunk fiber are combined to constitute a looped communication path. In a normal situation in which no breaking has occurred, a backup path is blocked by an optical switch, and communication between the OLT and each ONU is performed only through a normal path. When breaking has occurred to part of the normal path, the backup path is activated in addition to the normal path. Then, the OLT performs, through the backup path, communication with any disconnected ONU with which communication through the normal path has become impossible. Accordingly, communication with every disconnected ONU can be resumed without wait for repair of an optical fiber on the normal path.

CITATION LIST

Non-Patent Literature

Non-Patent Literature 1: Harada et al., "Cyclic Wavelength Allocation Scheme Reducing the Number of Wavelengths in Bus-Topology WDM Access Systems," IEICE (Institute of Electronics, Information and Communication Engineers) 2020, B-8-12, p. 159, March 2020.

Non-Patent Literature 2: Ujikawa et al., "Protection Architecture for Reliable Bus-topology WDM Access Systems," IEICE (Institute of Electronics, Information and Communication Engineers) 2020, B-8-14, p. 161, March 2020.

SUMMARY OF THE INVENTION

Technical Problem

In an optical communication system including a master station device and a plurality of slave station devices, the master station device performs communication control processing that controls communication with each of the plurality of slave station devices. Consider a case in which the communication control processing is performed based on "round-trip propagation time (hereinafter referred to as round trip time (RTT))" between the master station device and each slave station device. The master station device, which performs the communication control processing based on the RTT, needs to recognize the RTT of every slave station device.

For example, in a PON system, uplink communication from a plurality of slave station devices (ONUS) to a master station device (OLT) is performed by a time division multiple access (TDMA) scheme. To avoid contention of uplink optical signals transmitted from the plurality of ONUS, the OLT controls the transmission timing of the uplink optical signal from each ONU based on the RTT of the ONU. For the control, the OLT needs to recognize the RTT of every ONU as a communication counterpart in advance. Thus, when performing registration processing (discovery) that registers an ONU, the OLT measures the RTT of the ONU and holds the RTT together with any other registration information.

Consider a protection scheme using the backup path, as disclosed in Non-Patent Literature 2 described above. As described above, the OLT performs, through the backup path in place of the normal path, communication with any disconnected ONU with which communication through the normal path has become impossible. Thus, it is needed to perform the above-described registration processing for every disconnected ONU and newly measure the RTT in the case of communication through the backup path. However, a long time is needed to perform the registration processing for every disconnected ONU and newly measure the RTT. In other words, time taken for resuming communication increases.

It is an object of the present invention to provide a technology that can decrease time taken for resuming communication in a protection scheme using a backup path in an optical communication system including a master station device and a plurality of slave station devices.

Means for Solving the Problem

A first aspect of the present invention relates to an optical communication system.

The optical communication system includes:
   a plurality of slave station devices connected in parallel to a looped path; and
   a master station device connected to the looped path and configured to perform communication with each of the plurality of slave station devices.

A communication path between the master station device and each of the slave station devices includes:
   a normal path extending in a first direction through the looped path from the master station device to the slave station device; and
   a backup path extending in a second direction opposite to the first direction through the looped path from the master station device to the slave station device.

The master station device performs communication control processing that controls communication with each of the slave station devices based on round-trip propagation time (RTT) between the master station device and the slave station device.

Normal path RTT is the RTT in a case of the communication through the normal path.

Backup path RTT is the RTT in a case of the communication through the backup path.

A first slave station device is a slave station device with which the communication through the normal path has become impossible among the plurality of slave station devices.

First normal path RTT is the normal path RTT between the master station device and the first slave station device.

First backup path RTT is the backup path RTT between the master station device and the first slave station device.

First partial RTT is the RTT between the master station device and the looped path.

Loop propagation time is propagation time necessary for one trip through the looped path.

The master station device holds the normal path RTT, the first partial RTT, and the loop propagation time of each of the slave station devices.

The master station device calculates the first backup path RTT based on the first normal path RTT, the first partial RTT, and the loop propagation time.

The master station device performs the communication control processing for each of the slave station devices based on the normal path RTT when the first slave station device does not exist.

The master station device resumes the communication control processing for the first slave station device based on the calculated first backup path RTT without measuring the first backup path RTT when the first slave station device is sensed.

A second aspect of the present invention relates to a master station device configured to perform communication with each of a plurality of slave station devices in an optical communication system.

The plurality of slave station devices are connected in parallel to a looped path.

A communication path between the master station device and each of the slave station devices includes:
  a normal path extending in a first direction through the looped path from the master station device to the slave station device; and
  a backup path extending in a second direction opposite to the first direction through the looped path from the master station device to the slave station device.

The master station device performs communication control processing that controls communication with each of the slave station devices based on round-trip propagation time (RTT) between the master station device and the slave station device.

Normal path RTT is the RTT in a case of the communication through the normal path.

Backup path RTT is the RTT in a case of the communication through the backup path.

A first slave station device is a slave station device with which the communication through the normal path has become impossible among the plurality of slave station devices.

First normal path RTT is the normal path RTT between the master station device and the first slave station device.

First backup path RTT is the backup path RTT between the master station device and the first slave station device.

First partial RTT is the RTT between the master station device and the looped path.

Loop propagation time is propagation time necessary for one trip through the looped path.

The master station device holds the normal path RTT, the first partial RTT, and the loop propagation time of each of the slave station devices.

The master station device calculates the first backup path RTT based on the first normal path RTT, the first partial RTT, and the loop propagation time.

The master station device performs the communication control processing for each of the slave station devices based on the normal path RTT when the first slave station device does not exist.

The master station device resumes the communication control processing for the first slave station device based on the calculated first backup path RTT without measuring the first backup path RTT when the first slave station device is sensed.

A third aspect of the present invention relates to an optical communication method of performing communication between a master station device and each of a plurality of slave station devices in an optical communication system.

The plurality of slave station devices are connected in parallel to a looped path.

A communication path between the master station device and each of the slave station devices includes:
  a normal path extending in a first direction through the looped path from the master station device to the slave station device; and
  a backup path extending in a second direction opposite to the first direction through the looped path from the master station device to the slave station device.

Communication control processing that controls communication between the master station device and each of the slave station devices is performed based on round-trip propagation time (RTT) between the master station device and the slave station device.

Normal path RTT is the RTT in a case of the communication through the normal path.

Backup path RTT is the RTT in a case of the communication through the backup path.

A first slave station device is a slave station device with which the communication through the normal path has become impossible among the plurality of slave station devices.

First normal path RTT is the normal path RTT between the master station device and the first slave station device.

First backup path RTT is the backup path RTT between the master station device and the first slave station device, and first partial RTT is the RTT between the master station device and the looped path.

Loop propagation time is propagation time necessary for one trip through the looped path.

The optical communication method includes:
  holding the normal path RTT, the first partial RTT, and the loop propagation time of each of the slave station devices;
  calculating the first backup path RTT based on the first normal path RTT, the first partial RTT, and the loop propagation time;
  performing the communication control processing for each of the slave station devices based on the normal path RTT when the first slave station device does not exist; and resuming the communication control processing for the first slave station device based on the calculated first backup path RTT without measuring the first backup path RTT when the first slave station device is sensed.

Effects of the Invention

There are two kinds of communication paths, namely, a normal path and a backup path, between a master station device and each slave station device. Thus, it is possible to resume, through the backup path, communication with a first slave station device with which communication through the normal path has become impossible. However, in this case, first backup path RTT is needed for every first slave station device. According to the present invention, the first backup path RTT is calculated based on first normal path RTT, first partial RTT, and loop propagation time. Thus, it is possible to resume communication control processing for the first slave station device based on the calculated first backup path RTT without measuring the first backup path RTT. It is not needed to perform registration processing for every first slave station device and directly measure the first backup path RTT. Thus, time taken for resuming communication is decreased.

DESCRIPTION OF EMBODIMENTS

An embodiment of the present invention will be described below with the accompanying drawings.

1. OVERVIEW 1-1. Basic Configuration

Figure 1:
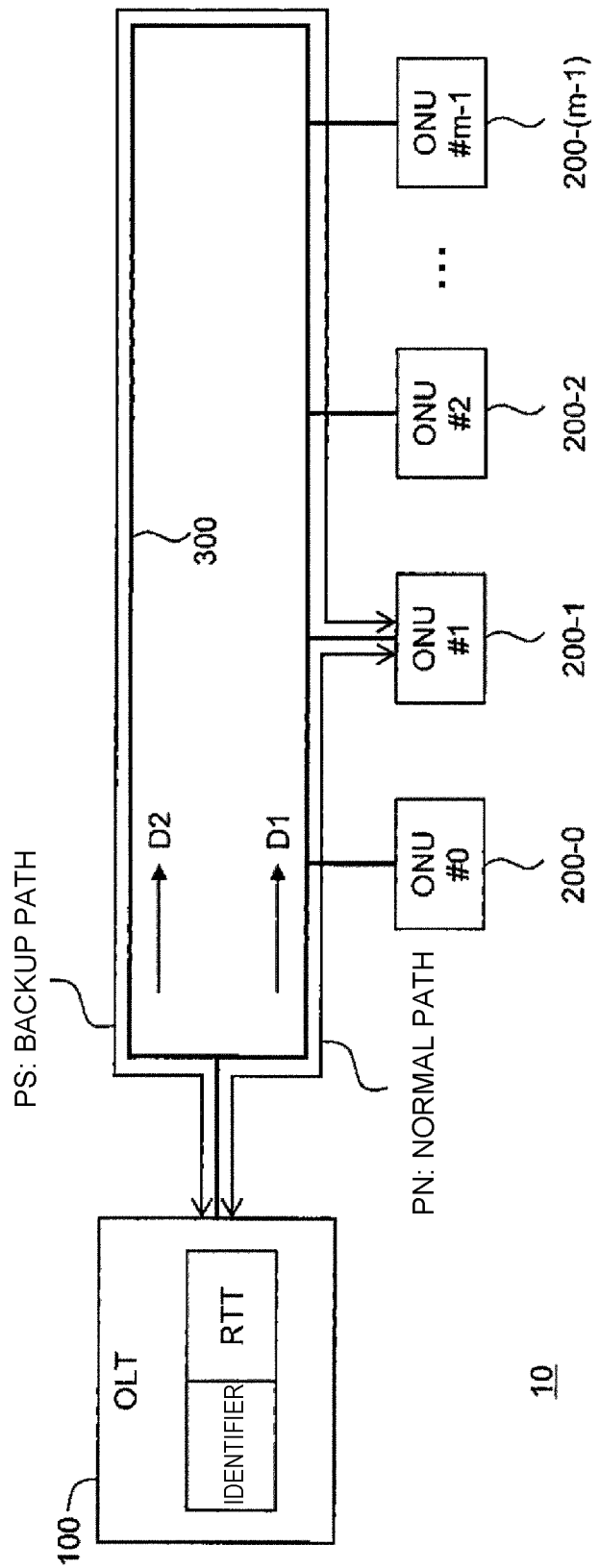
FIG. 1 is a conceptual diagram schematically illustrating the configuration of an optical communication system according to an embodiment of the present invention.

FIG. 1 schematically illustrates the configuration of an optical communication system 10 according to the present embodiment. The optical communication system 10 includes a master station device 100 and a plurality of slave station devices 200. In an example illustrated in FIG. 1, the optical communication system 10 includes m slave station devices 200-$i$ ($i$=0 to m−1). The number m is an integer equal to or larger than two. The master station device 100 is connected to the plurality of slave station devices 200 through optical fibers and performs optical communication with each of the plurality of slave station devices 200.

In the following description, the optical communication system 10 is a passive optical network (PON) system. The master station device 100 is referred to as an "optical line termination or optical line terminal (OLT) 100" below. Each slave station device 200 is referred to as an "optical network unit (ONU) 200" below.

In the present embodiment, network topology of the OLT 100 and the ONUS 200 is bus topology. More specifically, as illustrated in FIG. 1, the optical communication system 10 includes a looped path 300 constituted by a trunk fiber disposed in a loop shape. The OLT 100 is connected to the looped path 300. The plurality of ONUS 200 are connected in parallel to the looped path 300.

Since the looped path 300 is provided, a communication path between the OLT 100 and each ONU 200 includes two kinds of paths, namely, a normal path PN and a backup path PS. For example, in the case of a downlink direction from the OLT 100 to each ONU 200, the normal path PN is a communication path extending in a first direction D1 through the looped path 300. On the other hand, the backup path PS is a communication path extending in a second direction D2 opposite to the first direction D1 through the looped path 300. FIG. 1 illustrates, as an example, the normal path PN and the backup path PS for the ONU 200-1.

1-2. Normal Operation

Figure 2:
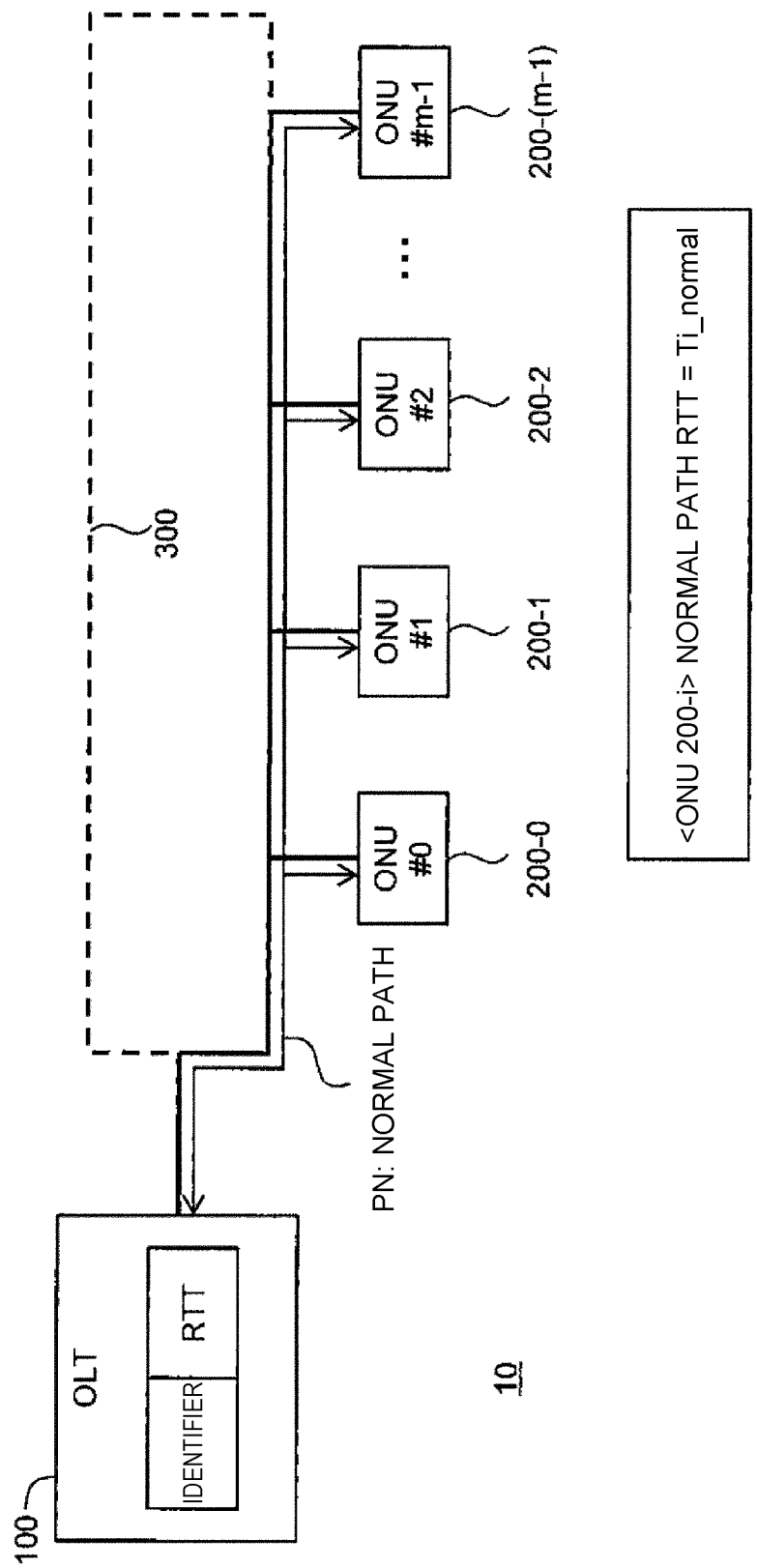
FIG. 2 is a conceptual diagram for description of normal operation of the optical communication system according to the embodiment of the present invention.

FIG. 2 is a conceptual diagram for description of normal operation of the optical communication system 10. In the normal operation, the OLT 100 performs communication with each ONU 200 through the normal path PN. Thus, the OLT 100 activates the normal path PN and deactivates the backup path PS.

First, to establish a communication link with each ONU 200 connected to a PON network, the OLT 100 performs "registration processing (discovery)" that registers the ONU 200. In the registration processing, the OLT 100 detects each ONU 200 connected to the PON network and provides an identifier to the detected ONU 200. The OLT 100 notifies the ONU 200 of the provided identifier, and the ONU 200 holds the notified identifier. In addition, in the registration processing, the OLT 100 performs "ranging processing" that measures round-trip propagation time (hereinafter referred to as round trip time (RTT)) between each ONU 200 and the OLT 100. The OLT 100 holds the identifier and the RTT of each ONU 200 in association with each other. After completion of the registration processing, the OLT 100 starts communication with each ONU 200.

The OLT 100 performs "communication control processing" that controls communication with each of the plurality of ONUS 200. Uplink communication from the plurality of ONUS 200 using the same wavelength to the OLT 100 is performed by a time division multiple access (TDMA) scheme. To avoid contention of uplink optical signals transmitted from the plurality of ONUS 200, the OLT 100 determines the transmission timing and the transmission amount of the uplink optical signal from each ONU 200 based on the RTT of the ONU 200. Then, the OLT 100 generates, for each ONU 200, transmission permission information including the identifier, the transmission timing, and the transmission amount.

The OLT 100 transmits the transmission permission information generated for each ONU 200. The transmission permission information reaches the plurality of ONUS 200 through the normal path PN. Each ONU 200 refers to the identifier included in the transmission permission information and identifies the transmission permission information for the ONU 200. Then, each ONU 200 transmits an uplink optical signal in accordance with the transmission timing and the transmission amount indicated by the transmission permission information. The uplink optical signal transmitted from each ONU 200 reaches the OLT 100 through the normal path PN.

In this manner, the OLT 100 holds the RTT and the identifier for each ONU 200 and performs communication control processing for each ONU 200 based on the RTT and the identifier. For the sake of simplicity, the RTT in the case of communication through the normal path PN is referred to as "normal path RTT" below. In the normal operation illustrated in FIG. 2, the OLT 100 performs communication control processing for each ONU 200 based on the normal path RTT of the ONU 200.

1-3. Protection

Subsequently, a protection method of the optical communication system 10 according to the present embodiment will be described below.

Figure 3:
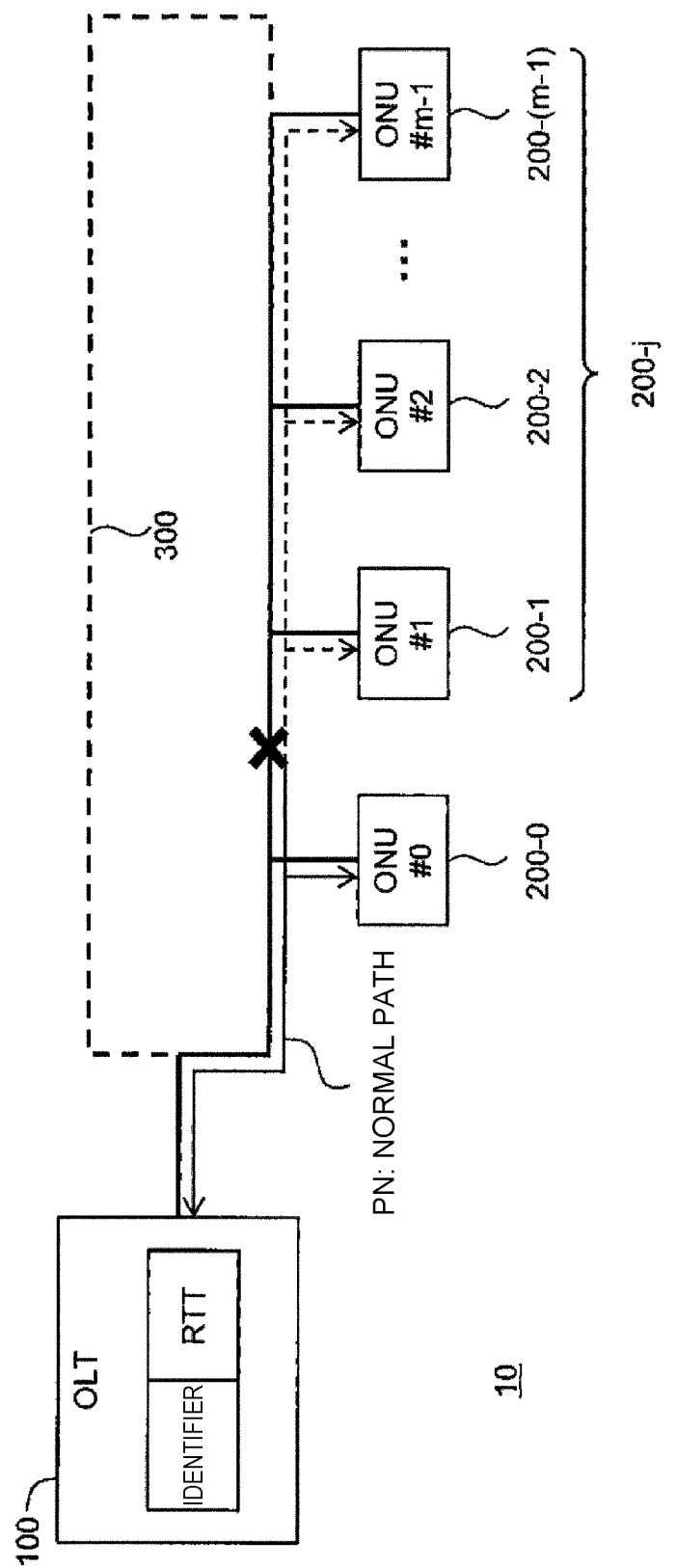
FIG. 3 is a conceptual diagram for description of a situation in which fiber breaking has occurred in the optical communication system according to the embodiment of the present invention.

FIG. 3 is a conceptual diagram for description of a situation in which fiber breaking has occurred on the normal path PN. In the case of bus topology, communication with a large number of ONUS 200 is potentially disconnected when fiber breaking occurs. In the case of an example illustrated in FIG. 3, fiber breaking has occurred in the interval between the ON 200-0 and the ONU 200-1. As a result, communication with the ONUS 200-1 to 200-($m-1$) is disconnected. An ONU 200 with which communication through the normal path PN has become impossible is referred to as a "disconnected ONU 200-$j$" below. In the example illustrated in FIG. 3, the ONUS 200-1 to 200-($m-1$) are disconnected ONUS 200-$j$ (j=1 to m-1). According to the present embodiment, the above-described backup path PS is used to resume (recover) communication with each disconnected ONU 200-$j$ at an early time.

Figure 4:
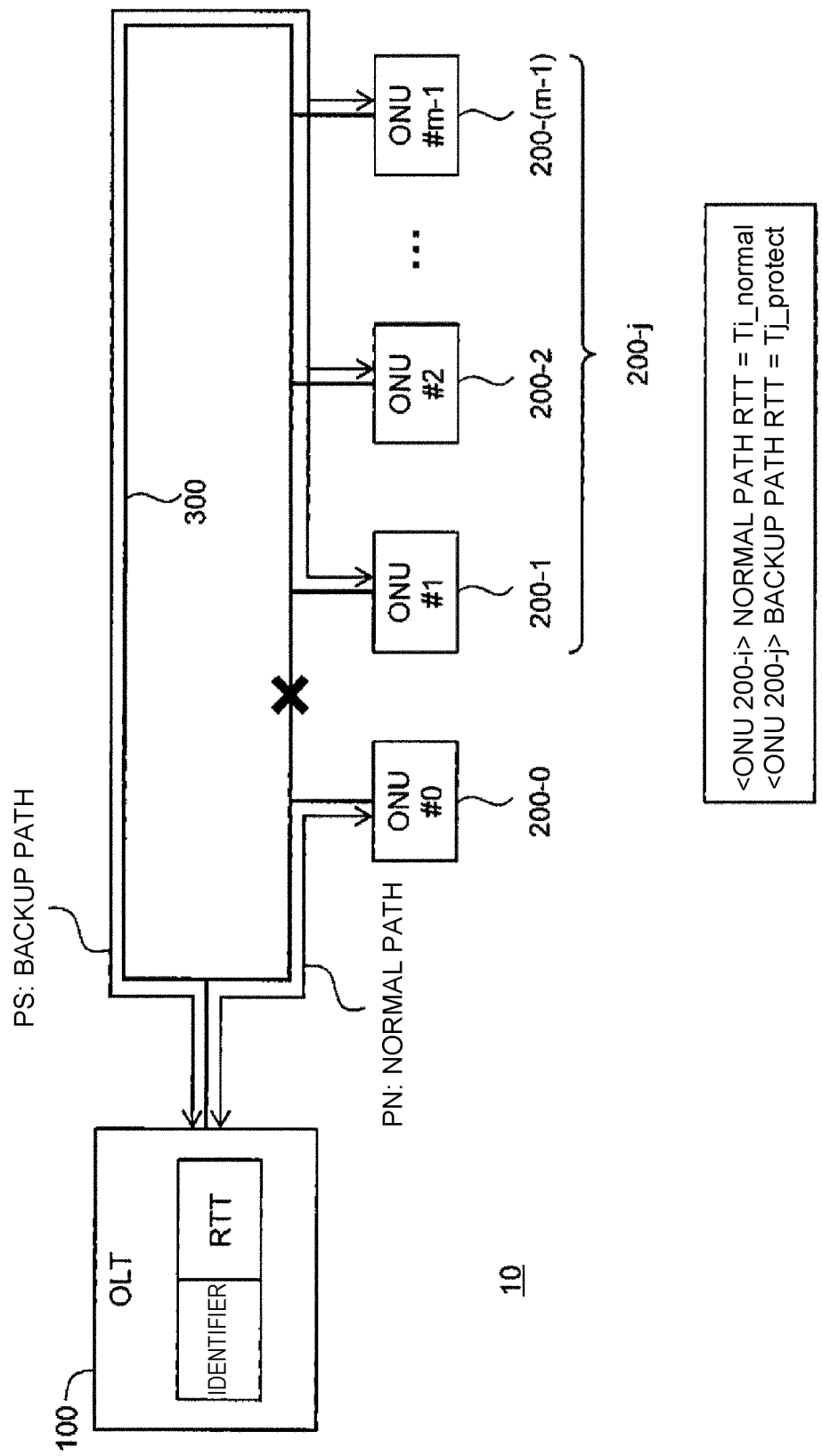
FIG. 4 is a conceptual diagram for description of operation of the optical communication system according to the embodiment of the present invention using a normal path and a backup path.

FIG. 4 is a conceptual diagram for description of operation of the optical communication system 10 using the normal path PN and the backup path PS. The OLT 100 activates the backup path PS in addition to the normal path PN. The OLT 100 performs communication with the ONU 200-0, which is nearer than a fiber breaking point, through the normal path PN. On the other hand, the OLT 100 performs communication with each disconnected ONU 200-$j$ (j=1 to m-1) through the backup path PS in place of the normal path PN. Accordingly, communication with every disconnected ONU 200-$j$ can be resumed without wait for repair of an optical fiber on the normal path PN.

However, the RTT in the case of communication through the backup path PS is needed to perform communication control processing for each disconnected ONU 200-$j$. The RTT in the case of communication through the backup path PS is referred to as "backup path RTT" below. The OLT 100 needs to recognize the backup path RTT of every disconnected ONU 200-$j$ before starting communication through the backup path PS. In other words, the RTT of every disconnected ONU 200-$j$ needs to be switched from the normal path RTT to the backup path RTT.

However, a long time is needed to newly measure the backup path RTT by performing the above-described registration processing for every disconnected ONU 200-$j$. In other words, time taken for resuming communication increases. As the number of disconnected ONUS 200-$j$ increases, the number of times of the registration processing necessary for acquiring the backup path RTT of every disconnected ONU 200-$j$ increases and the time taken for resuming communication increases. In addition, uplink communication from any registered ONU 200 needs to be temporarily stopped for the duration of QuietWindow set in the registration processing (ranging processing). Thus, uplink communication through the normal path PN temporary stops and uplink delay occurs along with the registration processing for each disconnected ONU 200-$j$.

Thus, the present embodiment provides a technology capable of swiftly acquiring the backup path RTT of every disconnected ONU 200-$j$.

Figure 5:
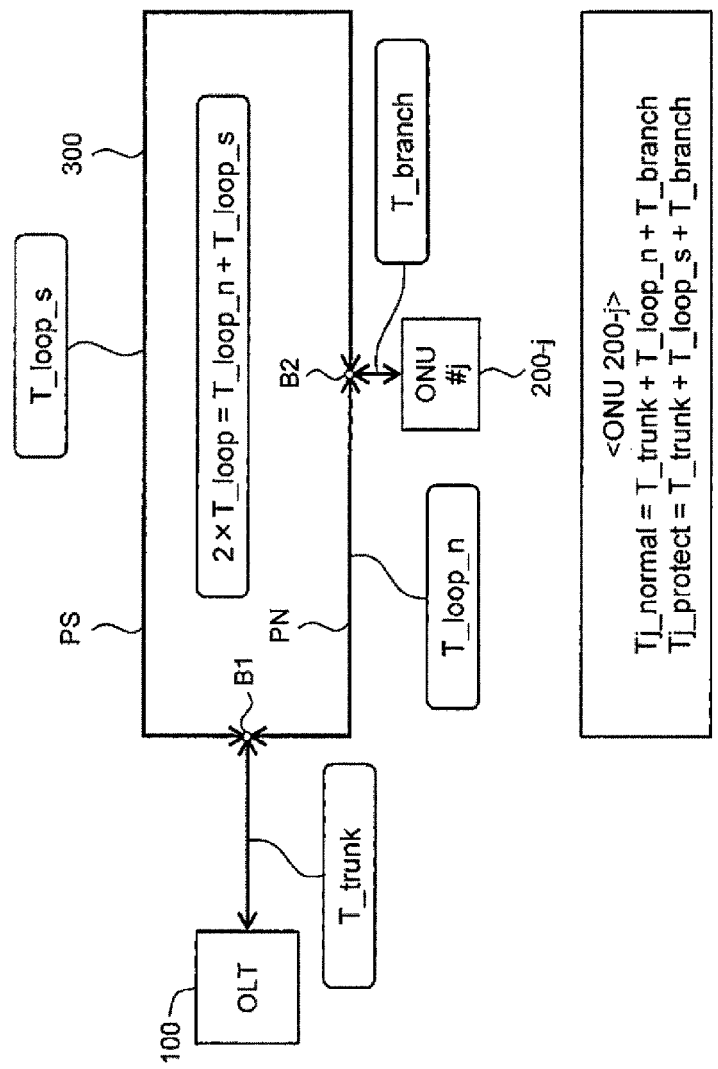
FIG. 5 is a conceptual diagram for description of a method of acquiring backup path RTT of a disconnected ONU according to the embodiment of the present invention.

FIG. 5 is a conceptual diagram for description of a method of acquiring the backup path RTT of each disconnected ONU 200-$j$.

The OLT 100 is connected to a first bifurcation point B1 on the looped path 300. The first bifurcation point B1 is a bifurcation point between the normal path PN and the backup path PS. First partial RTT (T_trunk) is the RTT between the OLT 100 and the looped path 300 (in other words, the first bifurcation point B1).

The disconnected ONU 200-$j$ is connected to a second bifurcation point B2 on the looped path 300. Second partial RTT (T_branch) is the RTT between the disconnected ONU 200-$j$ and the looped path 300 (in other words, the second bifurcation point B2).

Normal loop RTT (T_loop_n) is the RTT between the first bifurcation point B1 and the second bifurcation point B2 through the normal path PN. On the other hand, backup loop propagation time (T_loop_s) is the RTT between the first bifurcation point B1 and the second bifurcation point B2 through the backup path PS.

The normal path RTT between the OLT 100 and the disconnected ONU 200-*j* (first slave station device) is referred to as "first normal path RTT" below. The backup path RTT between the OLT 100 and the disconnected ONU 200-*j* is referred to as "first backup path RTT" below. As indicated by Expression (1) below, the first normal path RTT (Tj_normal) is the sum of the first partial RTT (T_trunk), the normal loop RTT (T_loop_n), and the second partial RTT (T_branch). In addition, as indicated by Expression (2) below, the first backup path RTT (Tj_protect) is the sum of the first partial RTT (T_trunk), the backup loop RTT (T_loop_s), and the second partial RTT (T_branch).

$$Tj\_normal = T\_trunk + T\_loop\_n + T\_branch \quad \text{Expression (1):}$$

$$Tj\_protect = T\_trunk + T\_loop\_s + T\_branch \quad \text{Expression (2):}$$

Loop propagation time (T_loop) is propagation time necessary for one trip through the looped path 300. A relation represented by Expression (3) below holds among the loop propagation time (T_loop), the normal loop RTT (T_loop_n), and the backup loop RTT (T_loop_s).

$$2 \times T\_loop = T\_loop\_n + T\_loop\_s \quad \text{Expression (3):}$$

With Expressions (1) to (3), the first backup path RTT (Tj_protect) is represented by Expression (4) below.

$$Tj\_protect = 2 \times (T\_trunk + T\_loop + T\_branch) - Tj\_normal \quad \text{Expression (4):}$$

When the connection distance between the disconnected ONU 200-*j* and the looped path 300 is negligibly short, in other words, when the second partial RTT (T_branch) is negligibly short, the first backup path RTT (Tj_protect) is represented by Expression (5) below.

$$Tj\_protect = 2 \times (T\_trunk + T\_loop) - Tj\_normal \quad \text{Expression (5):}$$

The OLT 100 measures and holds the first partial RTT (T_trunk) and the loop propagation time (T_loop) in advance. The first normal path RTT (Tj_normal) is measured and known through the above-described registration processing. The OLT 100 does not delete but holds registration information (the identifier and the first normal path RTT) related to the disconnected ONU 200-*j* even after the disconnected ONU 200-*j* is sensed. Thus, the OLT 100 can calculate the first backup path RTT (Tj_protect) for every disconnected ONU 200-*j* based on the first partial RTT (T_trunk), the loop propagation time (T_loop), and the first normal path RTT (Tj_normal). For example, the OLT 100 calculates the first backup path RTT (Tj_protect) for each disconnected ONU 200-*j* in accordance with the above-described Expression (5).

In this manner, the OLT 100 can calculate the first backup path RTT (Tj_protect) without directly measuring the first backup path RTT (Tj_protect). The OLT 100 resumes communication control processing for each disconnected ONU 200-*j* based on the calculated first backup path RTT (Tj_protect). The identifier of the disconnected ONU 200-*j* does not change and thus does not need to be updated. The disconnected ONU 200-*j* does not delete but continues holding the identifier.

Error potentially occurs to the first backup path RTT (Tj_protect) calculated in accordance with the above-described Expression (5). In this case, the OLT 100 may set a slightly longer Grant duration that is allocated to each disconnected ONU 200-*j*.

After communication resumption, the OLT 100 may periodically measure and update the first backup path RTT (Tj_protect). Accordingly, the accuracy of the first backup path RTT (Tj_protect) further increases.

1-4. Effects

As described above, according to the present embodiment, the plurality of ONUS 200 are connected in parallel to the looped path 300. In this configuration, there are two kinds of communication paths, namely, the normal path PN and the backup path PS, between the OLT 100 and each ONU 200. Communication with a disconnected ONU 200-*j* with which communication through the normal path PN has become impossible can be resumed through the backup path PS in place of the normal path PN. Accordingly, communication with every disconnected ONU 200-*j* can be resumed without wait for repair of an optical fiber on the normal path PN.

The first backup path RTT (Tj_protect) in the case of communication through the backup path PS is needed to perform communication control processing for a disconnected ONU 200-*j*. According to the present embodiment, the OLT 100 holds the normal path RTT of each ONU 200, the first partial RTT (T_trunk) between the OLT 100 and the looped path 300, and the loop propagation time (T_loop) necessary for one trip through the looped path 300. The first backup path RTT (Tj_protect) for a disconnected ONU 200-*j* can be calculated based on the first normal path RTT (Tj_normal), the first partial RTT (T_trunk), and the loop propagation time (T_loop) for the disconnected ONU 200-*j*. Thus, the communication control processing for the disconnected ONU 200-*j* can be resumed based on the calculated first backup path RTT (Tj_protect) without measuring the first backup path RTT (Tj_protect). It is not needed to perform the registration processing for every disconnected ONU 200-*j* and directly measure the first backup path RTT (Tj_protect). Thus, the time taken for resuming communication is further decreased. The time decreasing effect is more significant as the number of disconnected ONUS 200-*j* increases.

When the registration processing is performed, uplink communication through the normal path PN needs to be temporarily stopped for the above-described duration of QuietWindow. According to the present embodiment, since the registration processing does not need to be performed for every disconnected ONU 200-*j*, temporary stop and uplink delay of uplink communication along with the registration processing are prevented. Accordingly, the RTT switching method according to the present embodiment does not interfere with communication through the normal path PN.

In a method of a comparative example, the backup path RTT of every ONU 200 is measured in advance. However, in the comparative example, each time a new ONU 200 is connected to the PON network, the backup path RTT of the new ONU 200 needs to be measured. For this measurement, it is needed to temporarily stop the normal operation, deactivate the normal path PN, and activate the backup path PS. This is not realistic. According to the present embodiment, the normal operation does not need to be stopped when a new ONU 200 is connected to the PON network.

2. EXEMPLARY CONFIGURATION OF OPTICAL COMMUNICATION SYSTEM

Figure 6:
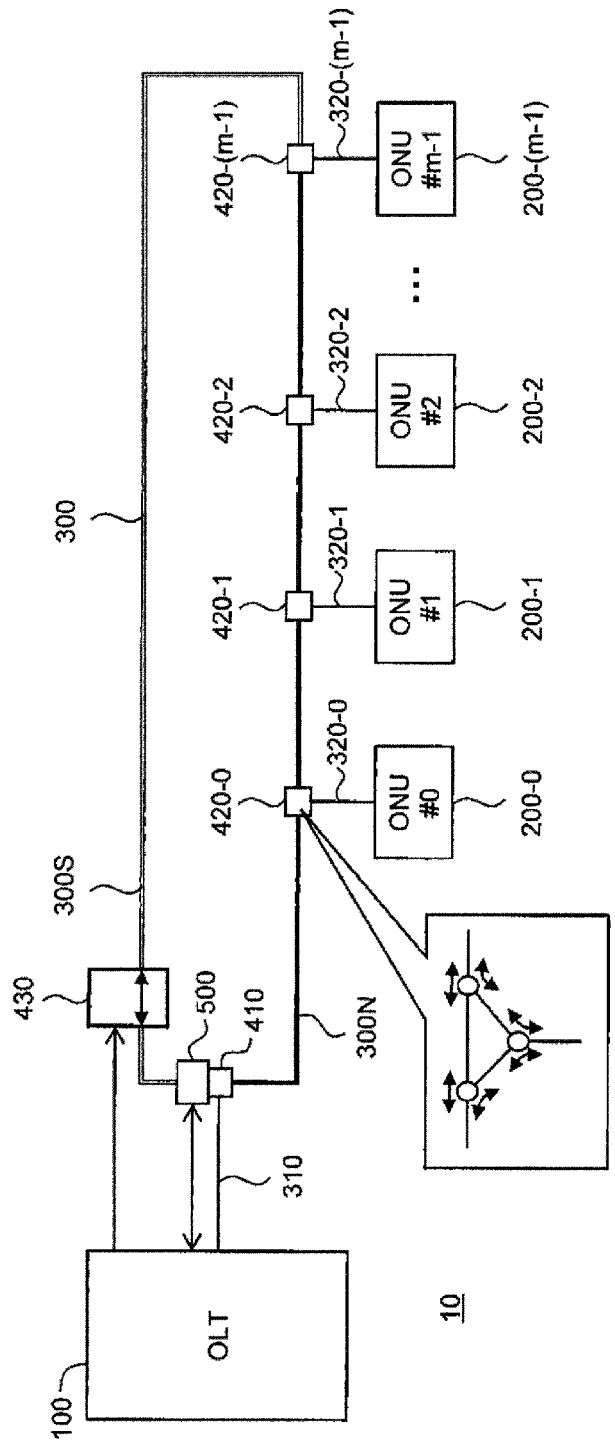
FIG. 6 is a conceptual diagram illustrating an exemplary configuration of the optical communication system according to the embodiment of the present invention.

FIG. 6 is a conceptual diagram illustrating an exemplary configuration of the optical communication system 10 according to the present embodiment. In the present example, the optical communication system 10 is a TWDM (time and wavelength division multiplexing)-PON system using a wavelength division multiplexing (WDM) technology.

The optical communication system 10 includes the OLT 100, the plurality of ONUs 200-$i$ ($i$=0 to m−1), optical fibers (300N, 300S, 310, and 320-$i$), optical combining/bifurcating devices 410 and 420-$i$, and an optical switch 430.

The OLT 100 is connected to the optical combining/bifurcating device 410 through the trunk fiber 310. The optical combining/bifurcating device 410 is connected to a main trunk fiber 300N and a backup trunk fiber 300S. The looped path 300 is constituted by connecting the main trunk fiber 300N and the backup trunk fiber 300S to each other in a loop shape. A communication path through the main trunk fiber 300N corresponds to the above-described normal path PN. On the other hand, a communication path through the backup trunk fiber 300S corresponds to the above-described backup path PS.

The plurality of ONUs 200-$i$ are connected in parallel to the looped path 300 (main trunk fiber 300N). More specifically, the plurality of optical combining/bifurcating devices 420-$i$ are sequentially disposed on the main trunk fiber 300N. The plurality of ONUs 200-$i$ are connected to the plurality of optical combining/bifurcating devices 420-$i$, respectively, through the plurality of branch fibers 320-$i$. It is preferable that the lengths of the plurality of branch fibers 320-$i$ are equal to each other in effect. The expression "lengths are equal to each other in effect" means that the lengths are equal to each other or variance in the lengths is negligibly small.

The optical combining/bifurcating devices 410 and 420-$i$ each distribute an optical signal received from one optical fiber to any other optical fiber. The optical combining/bifurcating device 410 corresponds to the first bifurcation point B1 illustrated in FIG. 5. The optical combining/bifurcating devices 420-$i$ corresponds to the second bifurcation point B2 illustrated in FIG. 5.

The optical switch 430 is provided on the backup trunk fiber 300S. The optical switch 430 activates/deactivates the backup path PS by allowing/blocking passing of optical signals on the backup trunk fiber 300S. This setting of the optical switch 430 is switched by the OLT 100.

Figure 7:
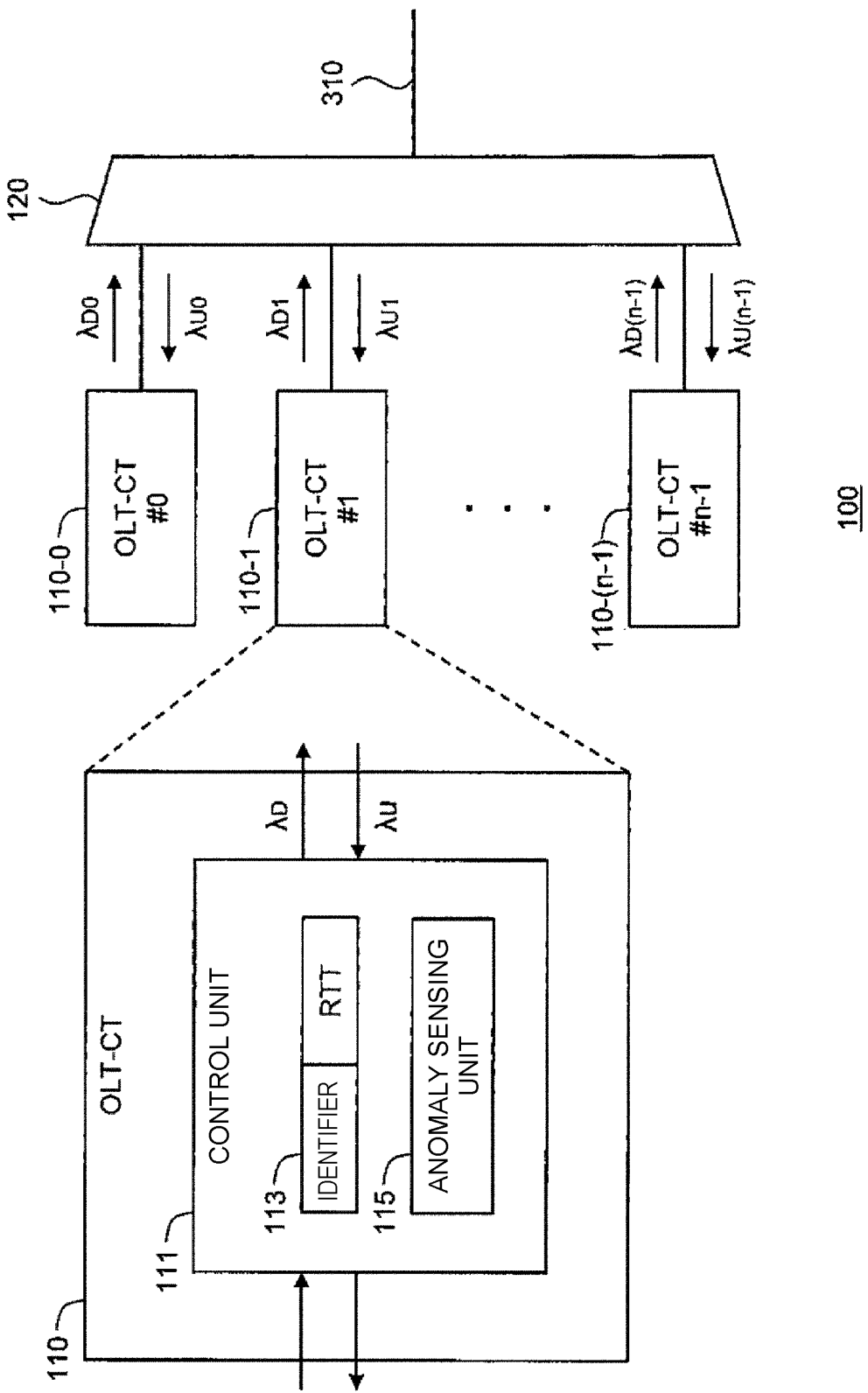
FIG. 7 is a conceptual diagram illustrating an exemplary configuration of a master station device (OLT) of the optical communication system according to the embodiment of the present invention.

FIG. 7 is a conceptual diagram illustrating an exemplary configuration of the OLT 100. The OLT 100 includes a plurality of channel termination devices 110-$x$ ($x$=0 to n−1) and a wavelength multiplexing/demultiplexing filter 120. The number n is an integer equal to or larger than two. Each channel termination device 110 is also called an OLT-CT (channel termination) or an OSU (optical subscriber unit).

Different wavelengths are allocated to the plurality of channel termination devices 110-$x$, respectively. Thus, the plurality of channel termination devices 110-$x$ perform communication by using optical signals of different wavelengths, respectively. More specifically, each channel termination device 110-$x$ performs downlink communication by using a downlink optical signal of a wavelength $\lambda_{Dx}$ and performs uplink communication by using an uplink optical signal of a wavelength $\lambda_{Ux}$. The wavelength $\lambda_{Dx}$ and the wavelength $\lambda_{Ux}$ are different from each other.

The wavelength multiplexing/demultiplexing filter 120 is connected to the plurality of channel termination devices 110-$x$. The wavelength multiplexing/demultiplexing filter 120 generates a downlink WDM signal by multiplexing downlink optical signals of the wavelength $\lambda_{Dx}$ each outputted from respective one of the plurality of channel termination devices 110-$x$, and outputs the downlink WDM signal to the trunk fiber 310. The downlink WDM signal is distributed to the plurality of ONUS 200-$i$.

Each ONU 200-$i$ has a wavelength variable function and is allocated to either channel termination device 110-$x$ (wavelengths $\lambda_{Dx}$ and $\lambda_{Ux}$). The ONU 200-$i$ extracts a downlink optical signal of the allocated wavelength $\lambda_{Dx}$ from the downlink WDM signal. In addition, the ONU 200-$i$ transmits an uplink optical signal of the allocated wavelength $\lambda_{Ux}$. The wavelength multiplexing/demultiplexing filter 120 demultiplexes uplink optical signals having various wavelengths and inputted from the trunk fiber 310 and outputs the uplink optical signal of the wavelength $\lambda_{Ux}$ to the channel termination device 110-$x$. In this manner, communication is performed between the channel termination device 110-$x$ and the ONU 200-$i$.

The connection distance between each of the plurality of channel termination devices 110-$x$ and the wavelength multiplexing/demultiplexing filter 120 is equal in effect. The expression "the connection distance is equal in effect" means that the connection distance is equal or variance in the connection distance is negligibly small.

Each channel termination device 110 includes a control unit 111. The control unit 111 registers one or more ONUS 200 as communication counterparts by performing the registration processing (discovery). The control unit 111 includes a storage unit 113. The storage unit 113 stores the identifier and the RTT of each ONU 200 as a communication counterpart in association with each other.

In addition, the control unit 111 performs communication control processing that controls communication with each ONU 200. Specifically, the control unit 111 determines the transmission timing and the transmission amount of an uplink optical signal from each ONU 200 based on the RTT of the ONU 200. Then, the control unit 111 generates, for each ONU 200, the transmission permission information (Grant) including the identifier, the transmission timing, and the transmission amount. The control unit 111 transmits the transmission permission information generated for each ONU 200. Each ONU 200 transmits an uplink optical signal in accordance with the transmission timing and the transmission amount indicated by the transmission permission information.

The control unit 111 also includes an anomaly sensing unit 115. The anomaly sensing unit 115 senses occurrence of fiber breaking on the normal path PN (main trunk fiber 300N). In other words, the anomaly sensing unit 115 senses a disconnected ONU 200-$j$ with which communication through the normal path PN has become impossible.

For example, after the above-described transmission permission information is transmitted, the anomaly sensing unit 115 monitors the status of reception of an uplink optical signal from an ONU 200 at the transmission destination. When the uplink optical signal is not received within a certain time period after the transmission of the transmission permission information, the anomaly sensing unit 115 determines that the ONU 200 has become a disconnected ONU 200-$j$.

In another example, the anomaly sensing unit 115 may determine that fiber breaking has occurred when uplink optical signals from a plurality of ONUS 200 are substantially simultaneously (within a certain time period) disrupted without reception of DyingGasp signals. In still another example, the anomaly sensing unit 115 may determine that fiber breaking has occurred when uplink optical signals from a plurality of ONUS 200 farther than a certain distance (RTT) are substantially simultaneously (within a certain time period) disrupted. In yet another example, the anomaly sensing unit 115 may sense fiber breaking by performing a test using an optical time domain reflectometer (OTDR).

Functions of the channel termination device 110 (control unit 111) are implemented by an optical transceiver configured to transmit and receive optical signals, a controller configured to perform control of the optical transceiver and various kinds of information processing, and the like. Typically, the controller includes a processor and a memory. The memory includes a transitory memory and a non-transitory memory. The functions of the channel termination device 110 are implemented as the processor executes a control program stored in the memory. The control program may be recorded in a computer-readable recording medium. The controller may be implemented by using a hardware component such as an application specific integrated circuit (ASIC), a programmable logic device (PLD), or a field programmable gate array (FPGA).

3. METHODS OF MEASURING FIRST PARTIAL RTT AND LOOP PROPAGATION TIME

As illustrated in FIG. 6, the optical communication system 10 according to the present embodiment further includes a propagation time measurement device 500. The propagation time measurement device 500 is used to measure the first partial RTT (T_trunk) and the loop propagation time (T_loop) described above. In the exemplary configuration illustrated in FIG. 6, the propagation time measurement device 500 is provided adjacent to the optical combining/bifurcating device 410 on the looped path 300.

Figure 8:
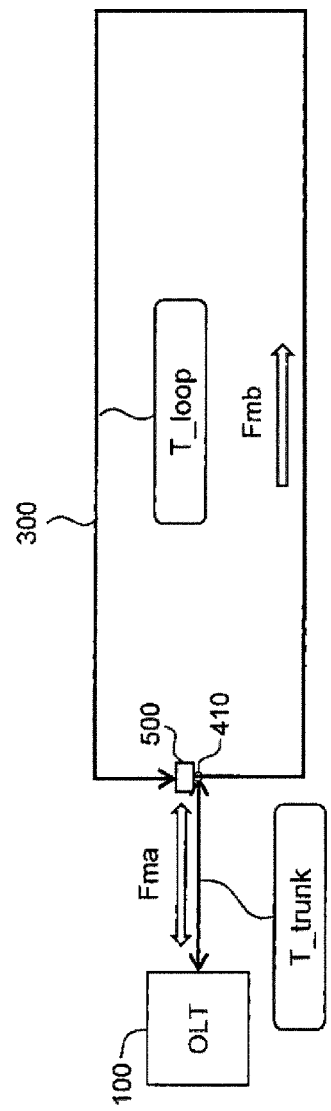
FIG. 8 is a conceptual diagram for description of exemplary methods of measuring first partial RTT and loop propagation time according to the embodiment of the present invention.

FIG. 8 is a conceptual diagram for description of exemplary methods of measuring the first partial RTT (T_trunk) and the loop propagation time (T_loop). In this measurement processing, the optical switch 430 is set to be in a conduction state and the backup path PS is activated.

The method of measuring the first partial RTT (T_trunk) is as follows. An optional channel termination device 110-r of the OLT 100 transmits a measurement frame Fma. The measurement frame Fma is inputted to the propagation time measurement device 500 through the optical combining/bifurcating device 410. Right after having received the measurement frame Fma, the propagation time measurement device 500 feeds the measurement frame Fma back to the channel termination device 110-r. The channel termination device 110-r receives the measurement frame Fma fed back from the propagation time measurement device 500. The channel termination device 110-r calculates, as the first partial RTT (T_trunk), the time period between the times of the transmission and reception of the measurement frame Fma.

Alternatively, the propagation time measurement device 500 may transmit the measurement frame Fma toward the OLT 100. Right after having received the measurement frame Fma, an optional channel termination device 110-r of the OLT 100 feeds back the measurement frame Fma. The propagation time measurement device 500 receives the measurement frame Fma fed back from the channel termination device 110-r. The propagation time measurement device 500 calculates, as the first partial RTT (T_trunk), the time period between the times of the transmission and reception of the measurement frame Fma. In addition, the propagation time measurement device 500 provides information of the first partial RTT (T_trunk) to the channel termination device 110-r. The scheme of communication between the propagation time measurement device 500 and the channel termination device 110-r is optional and not particularly limited.

The method of measuring the loop propagation time (T_loop) is as follows. The propagation time measurement device 500 provided on the looped path 300 transmits a measurement frame Fmb to the looped path 300. The measurement frame Fmb completes one trip through the looped path 300 and returns to the propagation time measurement device 500. The propagation time measurement device 500 receives the measurement frame Fmb having completed one trip through the looped path 300. The propagation time measurement device 500 calculates, as the loop propagation time (T_loop), the time period between the times of the transmission and reception of the measurement frame Fmb. Then, the propagation time measurement device 500 provides information of the loop propagation time (T_loop) to an optional channel termination device 110-r of the OLT 100.

The channel termination device 110-r notifies all other channel termination devices 110-s (s≠r) of the information of the first partial RTT (T_trunk) and the loop propagation time (T_loop). Each channel termination device 110-x (x=0 to n−1) holds the first partial RTT (T_trunk) and the loop propagation time (T_loop). Thus, the first partial RTT (T_trunk) and the loop propagation time (T_loop) are shared by all channel termination devices 110-x.

In the examples illustrated in FIGS. 6 and 8, the propagation time measurement device 500 is provided on the looped path 300. Such a propagation time measurement device 500 is configured to pass (transmit) a normal PON frame other than the measurement frames Fma and Fmb without any processing.

Figure 9:
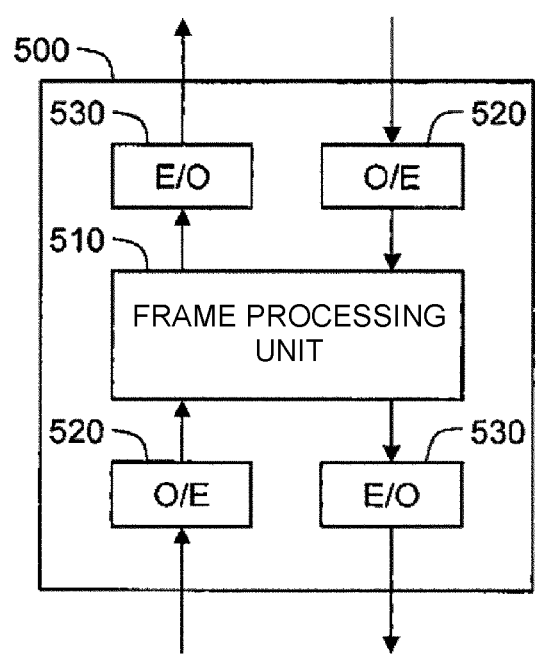
FIG. 9 is a block diagram illustrating an exemplary configuration of a propagation time measurement device according to the embodiment of the present invention.

FIG. 9 illustrates an exemplary configuration of the propagation time measurement device 500. The propagation time measurement device 500 includes a frame processing unit 510, an O/E converter 520, and an E/O converter 530. The O/E converter 520 converts an optical signal inputted from an optical fiber into an electric signal and outputs the electric signal to the frame processing unit 510. The E/O converter 530 converts an electric signal outputted from the frame processing unit 510 into an optical signal and outputs the optical signal to an optical fiber.

The frame processing unit 510 identifies the kind of a received frame and performs processing in accordance with the kind of the frame. For example, the frame processing unit 510 passes (transmits) a normal PON frame other than the measurement frames Fma and Fmb without any processing. In addition, right after having received the measurement frame Fma, the frame processing unit 510 feeds back the measurement frame Fma. Alternatively, when receiving the measurement frame Fma after having transmitted the measurement frame Fma, the frame processing unit 510 calculates the first partial RTT (T_trunk) from the times of the transmission and reception. When receiving the measurement frame Fmb after having transmitted the measurement frame Fmb, the frame processing unit 510 calculates the loop propagation time (T_loop) from the times of the transmission and reception.

4. PROCESS FLOW

Figure 10:
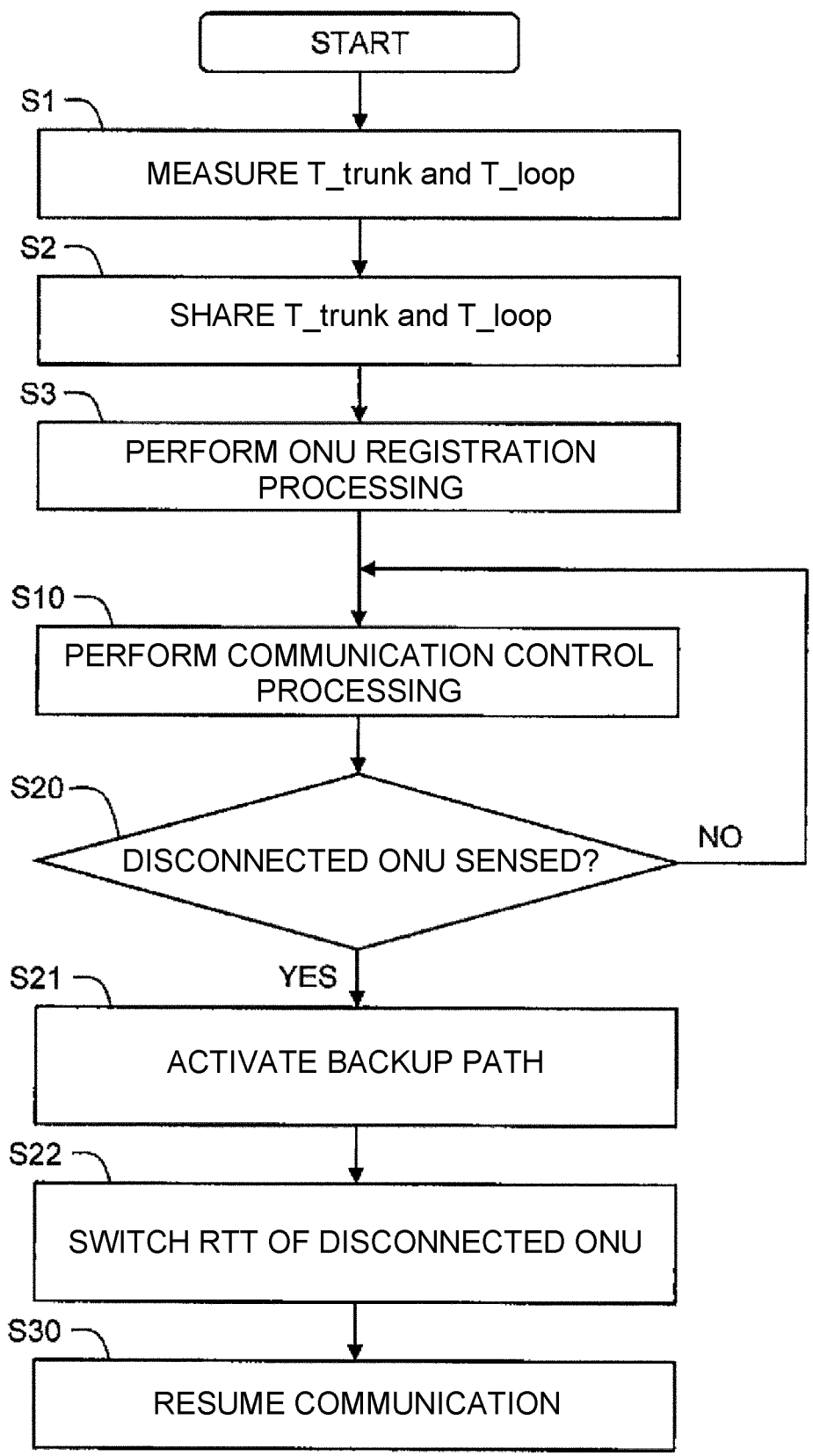
FIG. 10 is a flowchart illustrating exemplary processing by the optical communication system according to the embodiment of the present invention.

FIG. 10 is a flowchart illustrating exemplary processing by the optical communication system 10 according to the present embodiment.

At step S1, the OLT 100 operates the optical switch 430 to activate the backup path PS. The channel termination device 110-r and the propagation time measurement device 500 measure the first partial RTT (T_trunk) and the loop propagation time (T_loop) by the methods described above in Section 3. The channel termination device 110-*r* holds, in the storage unit 113, the first partial RTT (T_trunk) and the loop propagation time (T_loop) thus acquired. Thereafter, the OLT 100 operates the optical switch 430 to deactivate the backup path PS.

At step S2, the channel termination device 110-*r* notifies any other channel termination device 110-*s* (s≠r) of the first partial RTT (T_trunk) and the loop propagation time (T_loop). The other channel termination device 110-*s* holds, in the storage unit 113, the first partial RTT (T_trunk) and the loop propagation time (T_loop) thus notified. In this manner, the first partial RTT (T_trunk) and the loop propagation time (T_loop) are shared by all channel termination devices 110-*x* (x=0 to n−1).

At step S3, each channel termination device 110-*x* registers one or more ONUS 200 as communication counterparts. In this processing, the channel termination device 110-*x* measures the normal path RTT of each ONU 200 and provides an identifier to each ONU 200. The normal path RTT and the identifier of each ONU 200 are stored in the storage unit 113. In this manner, each channel termination device 110-*x* holds the normal path RTT and the identifier of each registered ONU 200 in the storage unit 113.

At step S3, each channel termination device 110-*x* may calculate the backup path RTT of each ONU 200 in advance. Specifically, the channel termination device 110-*x* calculates the backup path RTT of each ONU 200 based on the normal path RTT, the first partial RTT (T_trunk), and the loop propagation time (T_loop) of the ONU 200. For example, the channel termination device 110-*x* calculates the backup path RTT in accordance with Expression (5). The channel termination device 110-*x* holds the calculated backup path RTT in the storage unit 113 together with the normal path RTT and the identifier.

Accordingly, preparation for the normal operation is completed. Thereafter, main signal communication is started.

At step S10, each channel termination device 110-*x* performs communication with each registered ONU 200 through the normal path PN. In this processing, the channel termination device 110-*x* performs communication control processing for each ONU 20 based on the held normal path RTT and identifier thereof. The channel termination device 110-*x* may periodically measure and update the normal path RTT.

At step S20, each channel termination device 110-*x* (anomaly sensing unit 115) determines whether fiber breaking has occurred on the normal path PN. In other words, each channel termination device 110-*x* determines whether any disconnected ONU 200-*j* exists. When no disconnected ONU 200-*j* exists (No at step S20), the process returns to step S10. On the other hand, when at least one disconnected ONU 200-*j* is sensed (Yes at step S20), the process proceeds to step S21.

At step S21, the OLT 100 operates the optical switch 430 to activate the backup path PS in addition to the normal path PN.

At step S22, a channel termination device 110-*z* having performed communication with the disconnected ONU 200-*j* switches the RTT of the disconnected ONU 200-*j*. Specifically, the channel termination device 110-*z* switches the RTT of the disconnected ONU 200-*j* from the first normal path RTT (Tj_normal) to the first backup path RTT (Tj_protect). When the backup path RTT is calculated in advance at step S3 described above, the channel termination device 110-*z* acquires the first backup path RTT (Tj_protect) of the disconnected ONU 200-*j* from the storage unit 113.

When the backup path RTT is not calculated in advance at step S3 described above, the channel termination device 110-*z* calculates the first backup path RTT (Tj_protect) at step S22. Specifically, the channel termination device 110-*z* calculates the first backup path RTT (Tj_protect) based on the first normal path RTT (Tj_normal), the first partial RTT (T_trunk), and the loop propagation time (T_loop). For example, the channel termination device 110-*z* calculates the first backup path RTT (Tj_protect) in accordance with Expression (5). Then, the channel termination device 110-*z* switches the RTT of the disconnected ONU 200-*j* from the first normal path RTT (Tj_normal) to the first backup path RTT (Tj_protect).

The channel termination device 110-*z* does not delete but continues holding the registration information (the identifier and the first normal path RTT) of the disconnected ONU 200-*j* even after the disconnected ONU 200-*j* is sensed. The disconnected ONU 200-*j* does not delete but continues holding the identifier. The identifier of the disconnected ONU 200-*j* does not change and thus does not need to be updated.

At step S30, the channel termination device 110-*z* resumes communication by performing communication with the disconnected ONU 200-*j* through the backup path PS. More specifically, the channel termination device 110-*z* resumes communication control processing for the disconnected ONU 200-*j* based on the first backup path RTT (Tj_protect) and the identifier.

Error potentially occurs to the first backup path RTT (Tj_protect) calculated in accordance with the above-described Expression (5). Error also potentially occurs to the first backup path RTT (Tj_protect) when the first partial RTT (T_trunk) is different for each channel termination device 110. When error is expected, the channel termination device 110-*z* may set a slightly longer Grant duration allocated to the disconnected ONU 200-*j*.

After communication resumption, the channel termination device 110-*z* may periodically measure and update the first backup path RTT (Tj_protect). Accordingly, the accuracy of the first backup path RTT (Tj_protect) further increases.

5. MODIFICATIONS

Various modifications of the optical communication system 10 according to the present embodiment will be described below. Any duplicate description of the above description is omitted as appropriate.

5-1. First Modification

Figure 11:
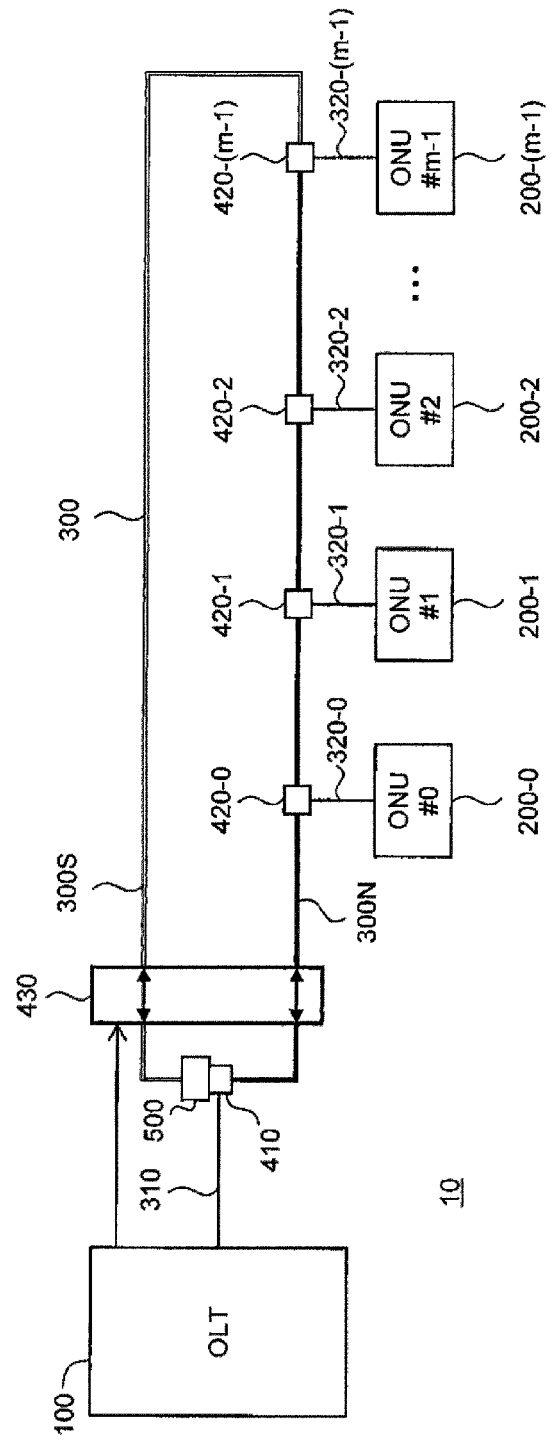
FIG. 11 is a conceptual diagram illustrating a first modification of the optical communication system according to the embodiment of the present invention.

FIG. 11 is a conceptual diagram illustrating a first modification. The optical switch 430 is provided on the main trunk fiber 300N and the backup trunk fiber 300S. The optical switch 430 activates/deactivates the normal path PN by allowing/blocking passing of optical signals on the main trunk fiber 300N. Similarly, the optical switch 430 activates/deactivates the backup path PS by allowing/blocking passing of optical signals on the backup trunk fiber 300S. When no disconnected ONU 200-*j* exists, the backup path PS is deactivated and only the normal path PN is activated. On the other hand, when any disconnected ONU 200-*j* is sensed, the normal path PN and the backup path PS are both activated.

5-2. Second Modification

Figure 12:
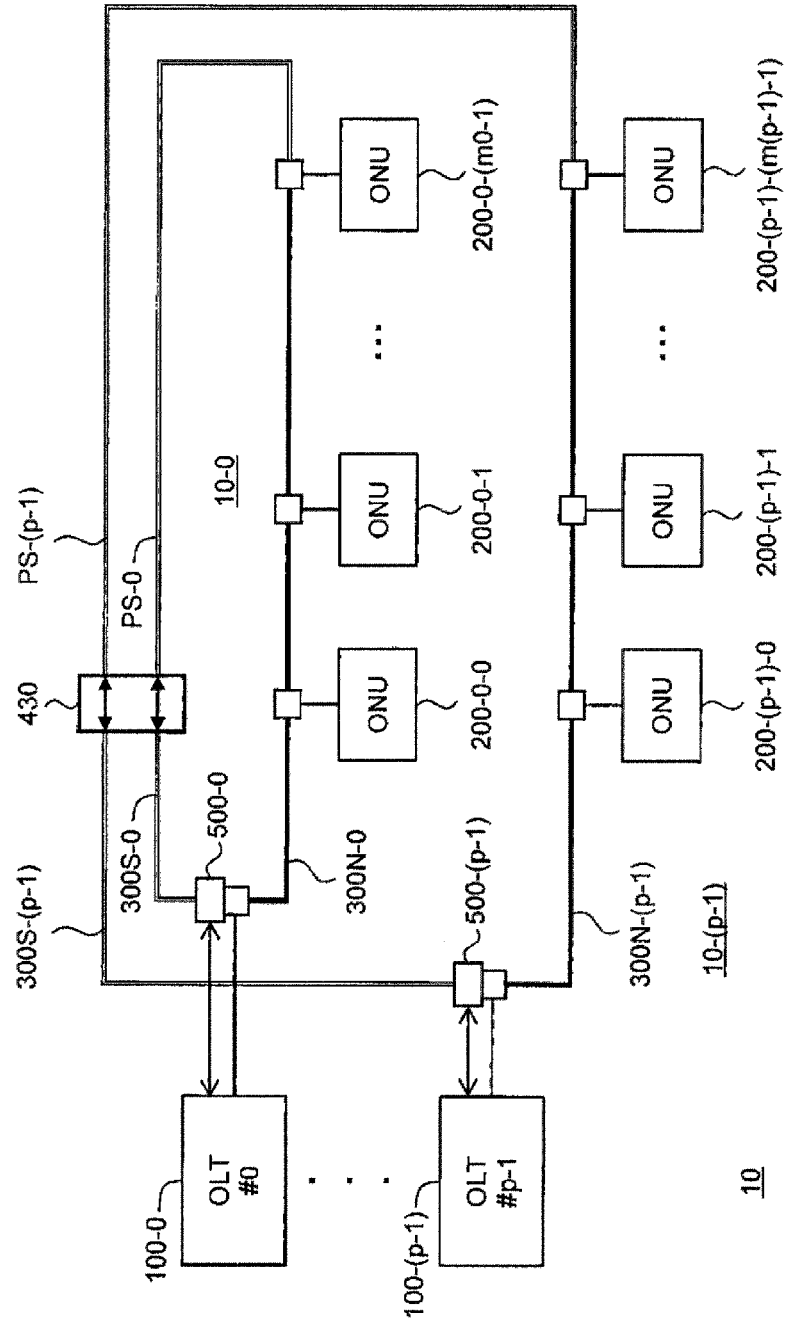
FIG. 12 is a conceptual diagram illustrating a second modification of the optical communication system according to the embodiment of the present invention.

FIG. 12 is a conceptual diagram illustrating a second modification. The optical communication system 10 includes a plurality of unit optical communication systems 10-$q$ (q=0 to p−1). The number p is an integer equal to or larger than two. Each of the unit optical communication systems 10-$q$ includes an OLT 100-$q$, a plurality of ONUs 200-$q$-0 to 200-$q$-(mq−1), a looped path 300-$q$, a propagation time measurement device 500-$q$, and the like.

However, the optical switch 430 is provided in common to the looped path 300-$q$ of each of the plurality of unit optical communication systems 10-$q$. The optical switch 430 can independently activate/deactivate a plurality of backup paths PS-q (q=0 to p−1). When fiber breaking has occurred to a unit optical communication system 10-$q$, the corresponding OLT 100-$q$ operates the optical switch 430 to activate the backup path PS-q of the unit optical communication system 10-$q$.

5-3. Third Modification

Figure 13:
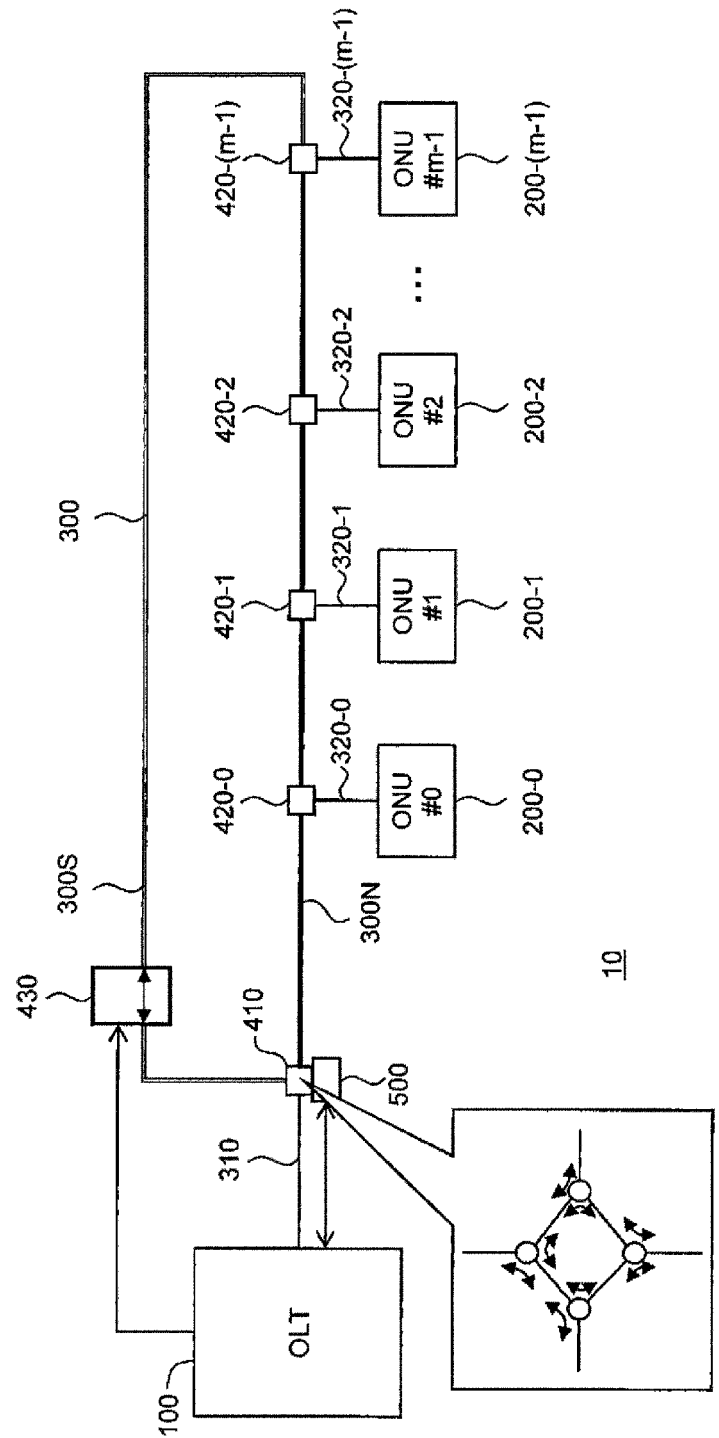
FIG. 13 is a conceptual diagram illustrating a third modification of the optical communication system according to the embodiment of the present invention.

FIG. 13 is a conceptual diagram illustrating a third modification. The propagation time measurement device 500 is provided adjacent to the optical combining/bifurcating device 410 but not on the looped path 300. The optical combining/bifurcating device 410 distributes optical signals received from the trunk fiber 310 and the looped path 300 to the propagation time measurement device 500. The optical combining/bifurcating device 410 also distributes optical signals transmitted from the propagation time measurement device 500 to the trunk fiber 310 and the looped path 300. Functions of the propagation time measurement device 500 are same as those described with reference to FIGS. 6 and 8. However, in the third modification, the propagation time measurement device 500 does not necessarily need to have a function to pass a normal PON frame other than the measurement frames Fma and Fmb without any processing.

5-4. Fourth Modification

Figure 14:
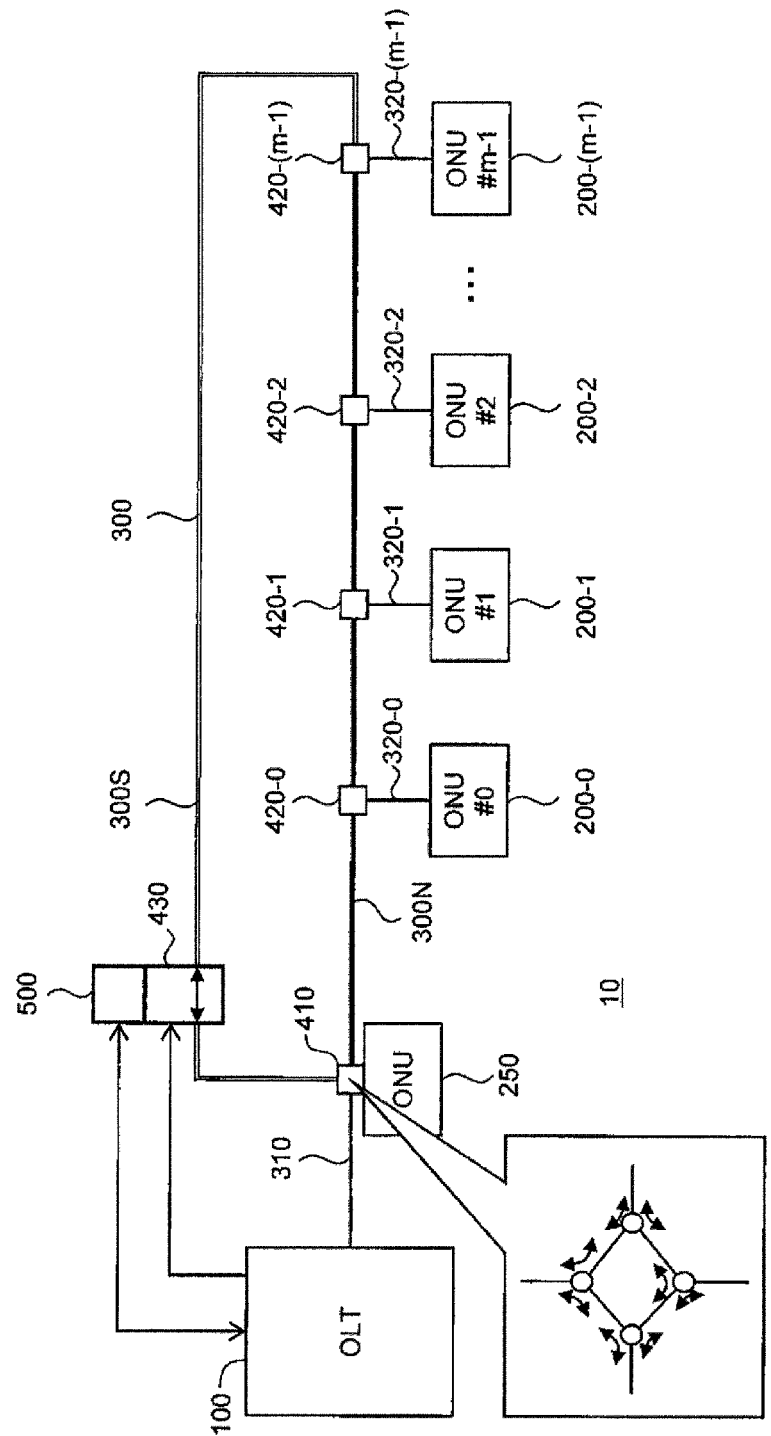
FIG. 14 is a conceptual diagram illustrating a fourth modification of the optical communication system according to the embodiment of the present invention.

FIG. 14 is a conceptual diagram illustrating a fourth modification. In the fourth modification, a measurement ONU 250 is used in place of the propagation time measurement device 500 to measure the first partial RTT (T_trunk). The measurement ONU 250 is provided adjacent to the optical combining/bifurcating device 410. The optical combining/bifurcating device 410 distributes optical signals received from the trunk fiber 310 to the measurement ONU 250. In addition, the optical combining/bifurcating device 410 outputs optical signals transmitted from the measurement ONU 250 to the trunk fiber 310.

The method of measuring the first partial RTT (T_trunk) is as follows. An optional channel termination device 110-$r$ of the OLT 100 transmits a measurement frame Fma. The measurement frame Fma is inputted to the measurement ONU 250 through the optical combining/bifurcating device 410. Right after having received the measurement frame Fma, the measurement ONU 250 feeds the measurement frame Fma back to the channel termination device 110-$r$. The channel termination device 110-$r$ receives the measurement frame Fma fed back from the measurement ONU 250. The channel termination device 110-$r$ calculates, as the first partial RTT (T_trunk), the time period between the times of the transmission and reception of the measurement frame Fma.

Any ONU 200 other than the measurement ONU 250 receives and feeds back the measurement frame Fma. However, the measurement frame Fma fed back from the measurement ONU 250 reaches the channel termination device 110-$r$ at the earliest time. Thus, the channel termination device 110-$r$ calculates the first partial RTT (T_trunk) by using the earliest reception time.

The propagation time measurement device 500 is used to measure the loop propagation time (T_loop). The propagation time measurement device 500 is provided adjacent to the optical switch 430.

Figure 15:
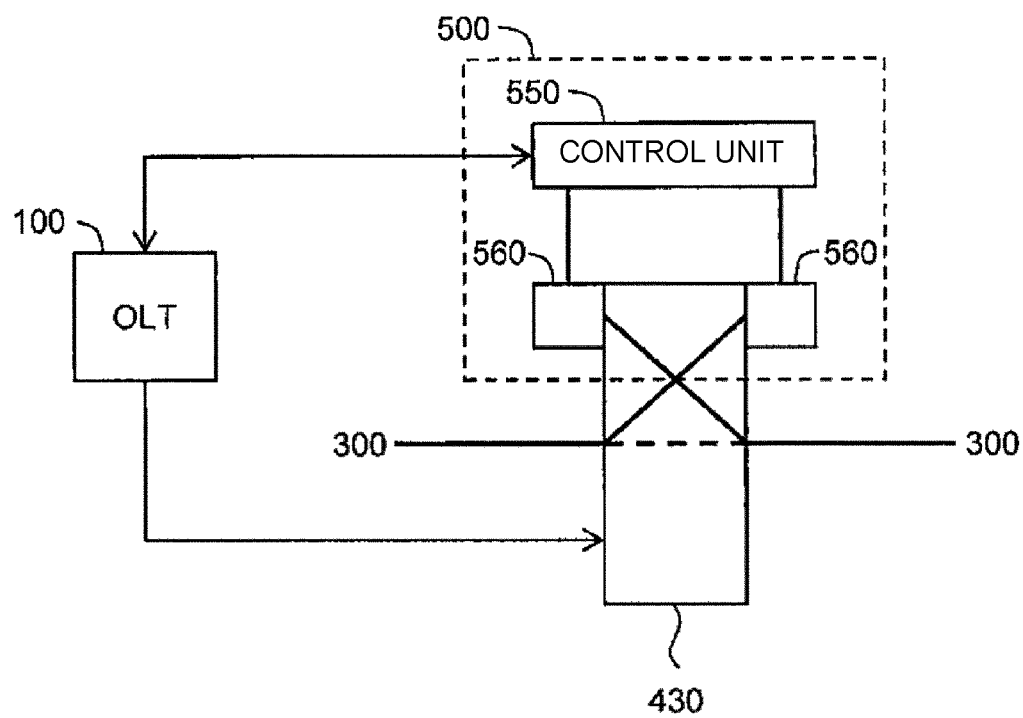
FIG. 15 is a conceptual diagram for description of measurement of the loop propagation time in the fourth modification.

FIG. 15 is a conceptual diagram for description of measurement of the loop propagation time (T_loop) in the fourth modification. The propagation time measurement device 500 includes a control unit 550 and two transmission/reception units 560. At measurement of the loop propagation time (T_loop), the OLT 100 operates the optical switch 430 to electrically connect each of the two transmission/reception units 560 to the looped path 300 on respective sides of the optical switch 430. Then, the control unit 550 transmits a measurement frame Fmb from one of the transmission/reception units 560 to the looped path 300. The measurement frame Fmb completes one trip through the looped path 300. The other transmission/reception unit 560 receives the measurement frame Fmb having completed one trip through the looped path 300. The control unit 550 calculates, as the loop propagation time (T_loop), the time period between the times of the transmission and reception of the measurement frame Fmb. After the measurement of the loop propagation time (T_loop) ends, the OLT 100 operates the optical switch 430 to disconnect electrical connection between each transmission/reception unit 560 and the looped path 300.

In the fourth modification, the propagation time measurement device 500 does not necessarily need to have a function to pass a normal PON frame other than the measurement frames Fma and Fmb without any processing.

5-5. Fifth Modification

Figure 16:
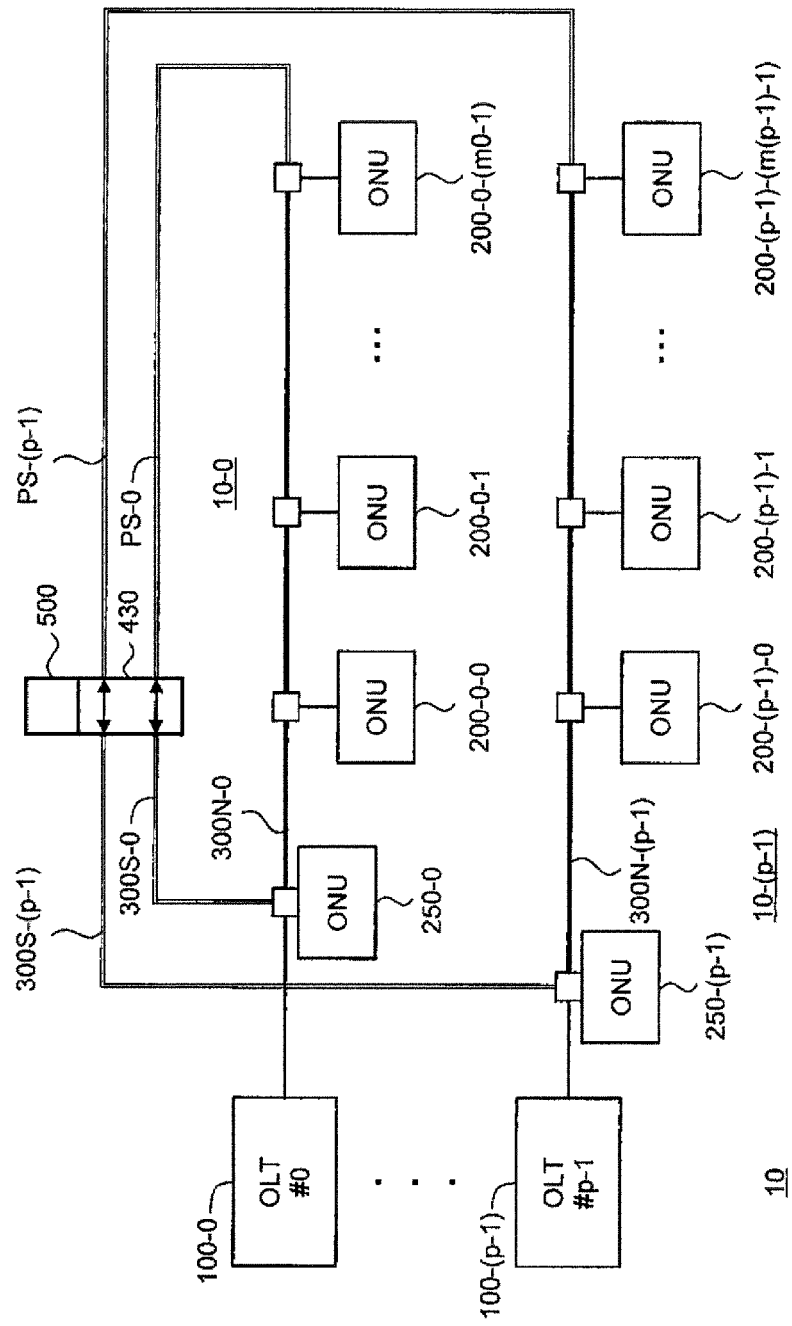
FIG. 16 is a conceptual diagram illustrating a fifth modification of the optical communication system according to the embodiment of the present invention.

FIG. 16 is a conceptual diagram illustrating a fifth modification. The fifth modification is a combination of the second modification (refer to FIG. 12) and the fourth modification (refer to FIG. 14). The optical communication system 10 includes a plurality of unit optical communication systems 10-$q$ (q=0 to p−1). Each of the unit optical communication systems 10-$q$ includes an OLT 100-$q$, a plurality of ONUs 200-$q$-0 to 200-$q$-(mq−1), a looped path 300-$q$, a measurement ONU 250-$q$, and the like.

As described in the second modification, the optical switch 430 is provided in common to the looped path 300-$q$ of each of the plurality of unit optical communication systems 10-$q$.

As described in the fourth modification, the propagation time measurement device 500 is provided adjacent to the optical switch 430. As a result, the propagation time measurement device 500 is also provided in common to the looped path 300-$q$ (q=0 to p−1) of each of the plurality of unit optical communication systems 10-$q$. Functions of the propagation time measurement device 500 are same as those in the fourth modification.

Figure 17:
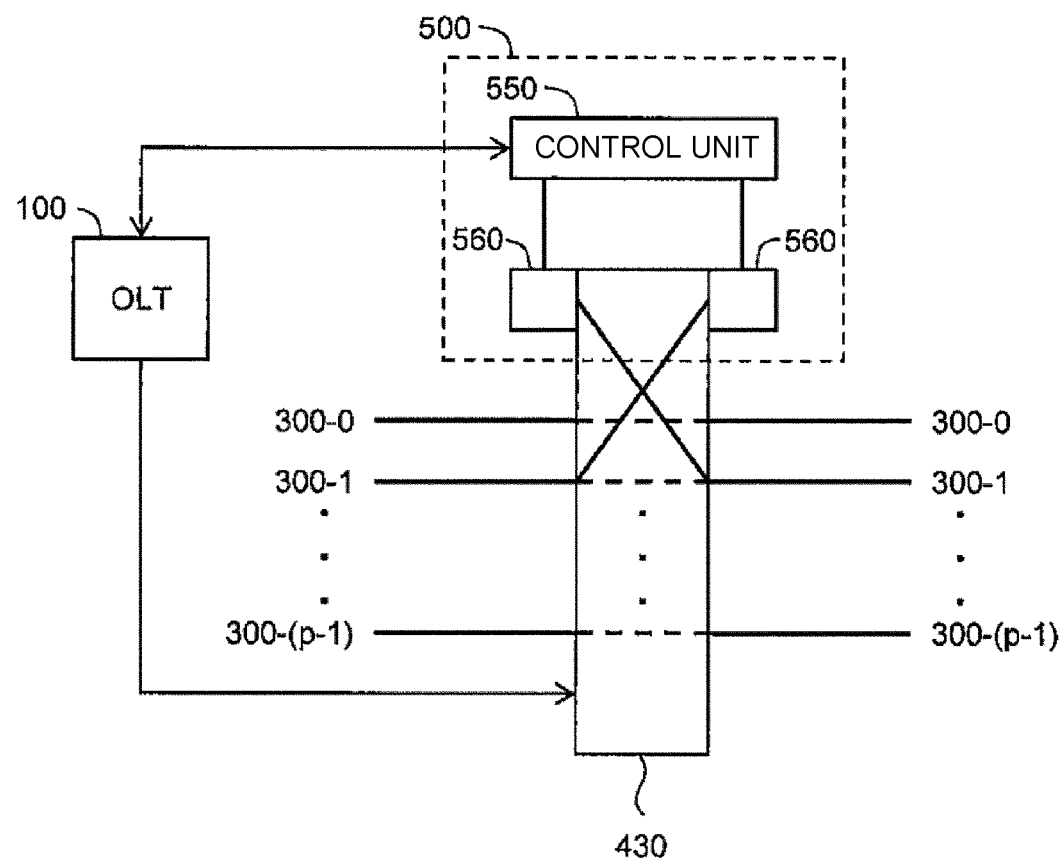
FIG. 17 is a conceptual diagram for description of measurement of the loop propagation time in the fifth modification.

FIG. 17 is a conceptual diagram for description of measurement of the loop propagation time (T_loop) in the fifth modification. In this example, measurement of the loop propagation time (T_loop) through the looped path 300-1 of the unit optical communication system 10-1 is considered as an example. The OLT 100 operates the optical switch 430 to electrically connect each of the two transmission/reception units 560 to the looped path 300-1 on respective sides of the optical switch 430. Then, the control unit 550 transmits a measurement frame Fmb from one of the transmission/reception units 560 to the looped path 300-1. The measurement frame Fmb completes one trip through the looped path 300-1. The other transmission/reception unit 560 receives the measurement frame Fmb having completed one trip through the looped path 300-1. The control unit 550 calculates, as the loop propagation time (T_loop) through the looped path 300-1, the time period between the times of the transmission and reception of the measurement frame Fmb. After the measurement of the loop propagation time (T_loop) ends, the OLT 100 operates the optical switch 430 to disconnect electrical connection between each transmission/reception unit 560 and the looped path 300-1.

Accordingly, the loop propagation time (T_loop) through the looped path 300-$q$ of a desired unit optical communication system 10-$q$ can be measured by switching a connecting destination of the propagation time measurement device 500.

5-6. Sixth Modification

Some of the first to fifth modifications may be combined without inconsistency. For example, the first modification may be combined with another modification.

6. OTHERS

The optical communication system 10 according to the present embodiment is not limited to a PON system. The method according to the present embodiment is applicable to any optical communication system including a looped path 300 and configured to perform communication control processing based on the RTT.

The optical communication system 10 according to the present embodiment is applied to, for example, a mobile fronthaul (MFH) for linearly or planarly expanding a mobile communication area.

REFERENCE SIGNS LIST

10 Optical communication system
100 OLT (master station device)
110 Channel termination device
111 Control unit
113 Storage unit
115 Anomaly sensing unit
120 Wavelength multiplexing/demultiplexing filter
200 ONU (slave station device)
200-$j$ Disconnected ONU
250 Measurement ONU
300 Looped path
300N Main trunk fiber
300S Backup trunk fiber
310 Trunk fiber
320 Branch fiber
410 Optical combining/bifurcating device
420 Optical combining/bifurcating device
430 Optical switch
500 Propagation time measurement device
510 Frame processing unit
520 O/E converter
530 E/O converter
550 Control unit
560 Transmission/reception unit
PN Normal path
PS Backup path

The invention claimed is:

1. An optical communication system comprising:
a plurality of slave station devices connected in parallel to a looped path; and
a master station device connected to the looped path and configured to perform communication with each of the plurality of slave station devices, wherein:
a communication path between the master station device and each of the slave station devices includes:
a normal path extending in a first direction through the looped path from the master station device to the slave station device; and
a backup path extending in a second direction opposite to the first direction through the looped path from the master station device to the slave station device,
the master station device performs communication control processing that controls communication with each of the slave station devices based on round-trip propagation time (hereinafter referred to as round trip time (RTT)) between the master station device and the slave station device,
normal path RTT is the RTT in a case of the communication through the normal path,
backup path RTT is the RTT in a case of the communication through the backup path,
a first slave station device is a slave station device with which the communication through the normal path has become impossible among the plurality of slave station devices,
first normal path RTT is the normal path RTT between the master station device and the first slave station device,
first backup path RTT is the backup path RTT between the master station device and the first slave station device,
first partial RTT is the RTT between the master station device and the looped path,
loop propagation time is propagation time necessary for one trip through the looped path,
the master station device holds the normal path RTT, the first partial RTT, and the loop propagation time of each of the slave station devices, the master station device calculates the first backup path RTT based on the first normal path RTT, the first partial RTT, and the loop propagation time,
the master station device performs the communication control processing for each of the slave station devices based on the normal path RTT when the first slave station device does not exist, and
the master station device resumes the communication control processing for the first slave station device based on the calculated first backup path RTT without measuring the first backup path RTT when the first slave station device is sensed.

2. The optical communication system according to claim 1,
wherein:
the first partial RTT, the loop propagation time, and the first normal path RTT are represented by T_trunk, T_loop, and Tj_normal, respectively, and
the master station device calculates 2×(T_trunk+ T_loop)−Tj_normal as the first backup path RTT.

3. The optical communication system according to claim 1, wherein:
the master station device provides an identifier to each of the slave station devices and holds the identifier,
each of the slave station devices holds the identifier provided by the master station device,
the master station device performs the communication control processing for each of the slave station devices based on the identifier and the RTT, and the master station device and the first slave station device do not delete but continue holding the identifier of the first slave station device even when the first slave station device is sensed.

4. The optical communication system according to claim 1, wherein:
the master station device deactivates the backup path when the first slave station device does not exist, and
the master station device activates the backup path when the first slave station device is sensed.

5. The optical communication system according to claim 1,
further comprising a propagation time measurement device configured to measure the loop propagation time by transmitting a measurement frame to the looped path and receiving the measurement frame having completed one trip through the looped path, wherein
the master station device receives information of the loop propagation time from the propagation time measurement device and holds the loop propagation time.

6. The optical communication system according to claim 5, further comprising a plurality of unit optical communication systems, wherein:
each of the plurality of unit optical communication systems includes the master station device, the plurality of slave station devices, and the looped path, and
the propagation time measurement device is provided in common to the looped path of each of the plurality of unit optical communication systems.

7. A master station device configured to perform communication with each of a plurality of slave station devices in an optical communication system, wherein:
the plurality of slave station devices are connected in parallel to a looped path,
a communication path between the master station device and each of the slave station devices includes:
a normal path extending in a first direction through the looped path from the master station device to the slave station device; and
a backup path extending in a second direction opposite to the first direction through the looped path from the master station device to the slave station device,
the master station device performs communication control processing that controls communication with each of the slave station devices based on round-trip propagation time (hereinafter referred to as round trip time (RTT)) between the master station device and the slave station device,
normal path RTT is the RTT in a case of the communication through the normal path,
backup path RTT is the RTT in a case of the communication through the backup path,
a first slave station device is a slave station device with which the communication through the normal path has become impossible among the plurality of slave station devices,
first normal path RTT is the normal path RTT between the master station device and the first slave station device,
first backup path RTT is the backup path RTT between the master station device and the first slave station device,
first partial RTT is the RTT between the master station device and the looped path,
loop propagation time is propagation time necessary for one trip through the looped path,
the master station device holds the normal path RTT, the first partial RTT, and the loop propagation time of each of the slave station devices, the master station device calculates the first backup path RTT based on the first normal path RTT, the first partial RTT, and the loop propagation time,
the master station device performs the communication control processing for each of the slave station devices based on the normal path RTT when the first slave station device does not exist, and
the master station device resumes the communication control processing for the first slave station device based on the calculated first backup path RTT without measuring the first backup path RTT when the first slave station device is sensed.

8. An optical communication method of performing communication between a master station device and each of a plurality of slave station devices in an optical communication system, wherein:
the plurality of slave station devices are connected in parallel to a looped path,
a communication path between the master station device and each of the slave station devices includes:
a normal path extending in a first direction through the looped path from the master station device to the slave station device; and
a backup path extending in a second direction opposite to the first direction through the looped path from the master station device to the slave station device,
communication control processing that controls communication between the master station device and each of the slave station devices is performed based on round-trip propagation time (hereinafter referred to as round trip time (RTT)) between the master station device and the slave station device,
normal path RTT is the RTT in a case of the communication through the normal path,
backup path RTT is the RTT in a case of the communication through the backup path,
a first slave station device is a slave station device with which the communication through the normal path has become impossible among the plurality of slave station devices,
first normal path RTT is the normal path RTT between the master station device and the first slave station device,
first backup path RTT is the backup path RTT between the master station device and the first slave station device,
first partial RTT is the RTT between the master station device and the looped path,
loop propagation time is propagation time necessary for one trip through the looped path, and
the optical communication method includes:
holding the normal path RTT, the first partial RTT, and the loop propagation time of each of the slave station devices;
calculating the first backup path RTT based on the first normal path RTT, the first partial RTT, and the loop propagation time;
performing the communication control processing for each of the slave station devices based on the normal path RTT when the first slave station device does not exist; and
resuming the communication control processing for the first slave station device based on the calculated first backup path RTT without measuring the first backup path RTT when the first slave station device is sensed.

* * * * *